United States Patent
Lee et al.

(10) Patent No.: US 12,314,513 B2
(45) Date of Patent: May 27, 2025

(54) INPUT SENSING PART AND DRIVING METHOD THEREOF

(71) Applicant: SAMSUNG DISPLAY CO., LTD., Yongin-si (KR)

(72) Inventors: Hyojin Lee, Yongin-si (KR); Soongyu Lee, Yongin-si (KR); Jinwoo Kim, Yongin-si (KR); Woomi Bae, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/328,285

(22) Filed: Jun. 2, 2023

(65) Prior Publication Data

US 2024/0069672 A1   Feb. 29, 2024

(30) Foreign Application Priority Data

Aug. 30, 2022   (KR) .......................... 10-2022-0109100

(51) Int. Cl.
*G06F 3/041*   (2006.01)
*G06F 3/044*   (2006.01)

(52) U.S. Cl.
CPC ...... *G06F 3/041662* (2019.05); *G06F 3/0446* (2019.05)

(58) Field of Classification Search
CPC .. G06F 3/041662; G06F 3/0416; G06F 3/046; G06F 3/044–0448; H10K 50/844; H10K 59/40
See application file for complete search history.

(56) References Cited

U.S. PATENT DOCUMENTS

| | | | | |
|---|---|---|---|---|
| 10,254,879 | B1 * | 4/2019 | Oral | G06F 3/0446 |
| 2009/0289914 | A1 * | 11/2009 | Cho | G06F 3/044 345/173 |
| 2009/0309851 | A1 * | 12/2009 | Bernstein | G06F 3/0446 345/174 |
| 2011/0267310 | A1 * | 11/2011 | Tsukahara | G06F 3/0446 702/65 |
| 2013/0076688 | A1 * | 3/2013 | Tokutake | G06F 3/0446 345/174 |
| 2015/0002441 | A1 * | 1/2015 | Brunet | G06F 3/0416 345/173 |
| 2016/0357328 | A1 * | 12/2016 | Hu | G06F 3/04886 |

(Continued)

FOREIGN PATENT DOCUMENTS

KR   10-1362843   2/2014

*Primary Examiner* — David Tung
(74) *Attorney, Agent, or Firm* — F. CHAU & ASSOCIATES, LLC

(57) ABSTRACT

A method of driving an input sensor to detect a proximity of a user includes driving the input sensor in a direct sensing mode, the input sensor including first sensing electrodes and second sensing electrodes insulated from the first sensing electrodes, and upon determining the user is engaged in a call, driving the input sensor in in a first proximity sensing mode by applying a driving signal to each of the first sensing electrodes. when the user has not performed the direct touch, and driving the input sensor in a second proximity sensing mode by applying no driving signal to a first subset of the first sensing electrodes and applying the driving signal to a second other subset of the first sensing electrodes, when the user has performed the direct touch.

17 Claims, 18 Drawing Sheets

(56) References Cited

U.S. PATENT DOCUMENTS

2018/0188943 A1\*  7/2018  Morita .................. G06F 3/0487
2018/0348933 A1\* 12/2018  Jun ....................... G06F 3/0448
2018/0367662 A1\* 12/2018  Kawamura ............. G06F 3/017
2020/0074913 A1\*  3/2020  Choi ................. G06F 3/041662

\* cited by examiner

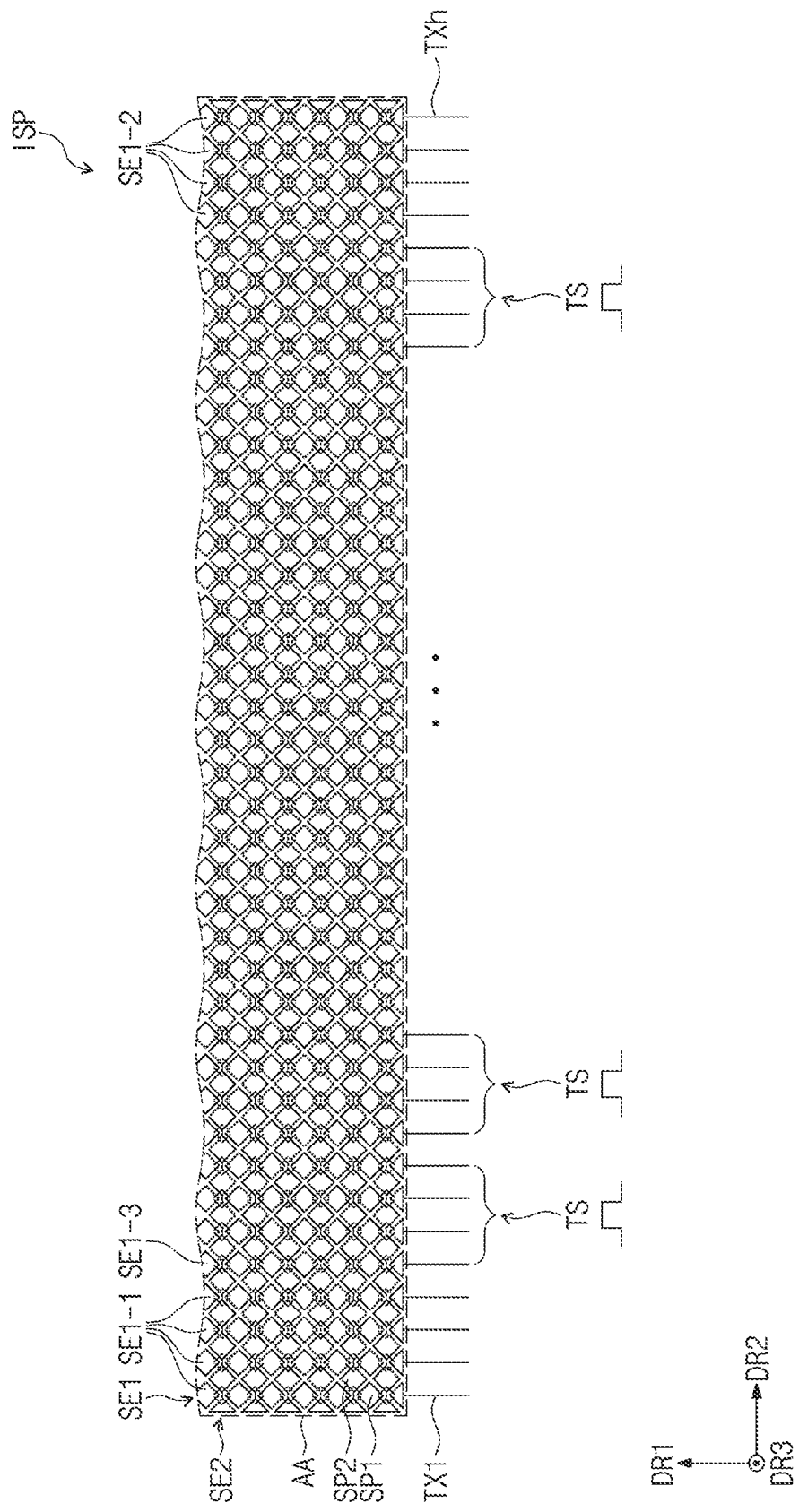

INPUT SENSING PART AND DRIVING METHOD THEREOF

CROSS-REFERENCE TO RELATED APPLICATIONS

This U.S. non-provisional patent application claims priority under 35 U.S.C. § 119 to Korean Patent Application No. 10-2022-0109100 filed on Aug. 30, 2022, in the Korean Intellectual Property Office, the disclosure of which is incorporated by reference in its entirety herein.

1. TECHNICAL FIELD

Embodiments of the present disclosure described herein relate to an input sensing part and a driving method thereof.

2. DISCUSSION OF RELATED ART

An electronic device, which provides an image to a user, such as a smartphone, a digital camera, a notebook computer, a navigation system, or a smart television includes a display device for displaying an image. The display device includes a display panel for generating an image, an input device for sensing a user provided input such as a touch, a camera for capturing an image of an external object, and various sensors.

An input sensing part of the input device is disposed on the display panel and is configured to sense the user's touch. The camera captures the image and stores image data representing the captured image. The sensors may include a fingerprint sensor, a proximity sensor, an illumination sensor, etc.

The fingerprint sensor senses a fingerprint of a finger of a user placed on the display panel. The proximity sensor may sense whether an object is close to the display device. The proximity sensor includes a light emitting part that generates and outputs a light and a light receiving part that senses a light reflected by an object. The illuminance sensor senses ambient luminance of the display device. Each of the fingerprint sensor, the proximity sensor, and the illuminance sensor is implemented with a separate module and is disposed within the display device.

SUMMARY

Embodiments of the present disclosure provide an input sensing part (e.g., an input sensor) capable of performing proximity sensing.

According to an embodiment, a method of driving an input sensor to detect a proximity of a user includes: driving the input sensor in a direct sensing mode to detect whether the user has performed a direct touch on the input sensor, the input sensing part including a plurality of first sensing electrodes and a plurality of second sensing electrodes insulated from the first sensing electrodes; and upon determining the user is engaged in a call, driving the input sensor in a first proximity sensing mode to detect the proximity of the user by applying a driving signal to each of the first sensing electrodes when the user has not performed the direct touch; and driving the input sensor in a second proximity sensing mode to detect the proximity of the user by applying no driving signal to a first subset of the first sensing electrodes and applying the driving signal to a second other subset of the first sensing electrodes when the user has performed the direct touch.

According to an embodiment, a method of driving an input sensor to detect a proximity of a user includes: driving the input sensor in a direct sensing mode whether the user has performed a direct touch on the input sensor, the input sensor including a plurality of first sensing electrodes and a plurality of second sensing electrodes insulated from the first sensing electrodes; and upon determining the user is engaged in a call, driving the input sensor in a first proximity sensing mode to detect the proximity of the user by applying a driving signal to each of the first sensing electrodes when the user has not performed the direct touch; and driving the input sensor in a second proximity sensing mode to detect the proximity of the user by applying no driving signal to the first sensing electrodes adjacent to a border of the input sensor from among the first sensing electrodes and applying the driving signal to the others of the first sensing electrodes, when the user has not performed the direct touch.

According to an embodiment, an input sensor includes a plurality of first sensing electrodes, a plurality of second sensing electrodes insulated from the first sensing electrodes, and a sensing control circuit that applies a driving signal to the first sensing electrodes. The first sensing electrodes include (1-1)-th sensing electrodes, (1-2)-th sensing electrodes spaced apart from the (1-1)-th sensing electrodes, and (1-3)-th sensing electrodes disposed between the (1-1)-th sensing electrodes and the (1-2)-th sensing electrodes. In a first proximity sensing mode, the driving signal is applied to the (1-1)-th sensing electrodes, the (1-2)-th sensing electrodes, and the (1-3)-th sensing electrodes. In a second proximity sensing mode, the driving signal is not applied to the (1-1)-th and (1-2)-th sensing electrodes, and the driving signal is applied to the (1-3)-th sensing electrodes.

BRIEF DESCRIPTION OF THE FIGURES

The above and other objects and features of the present disclosure will become apparent by describing in detail embodiments thereof with reference to the accompanying drawings.

FIG. 20 is a diagram for describing an operation of a second proximity sensing mode according to an embodiment of the present disclosure.

DETAILED DESCRIPTION

Figure 1:
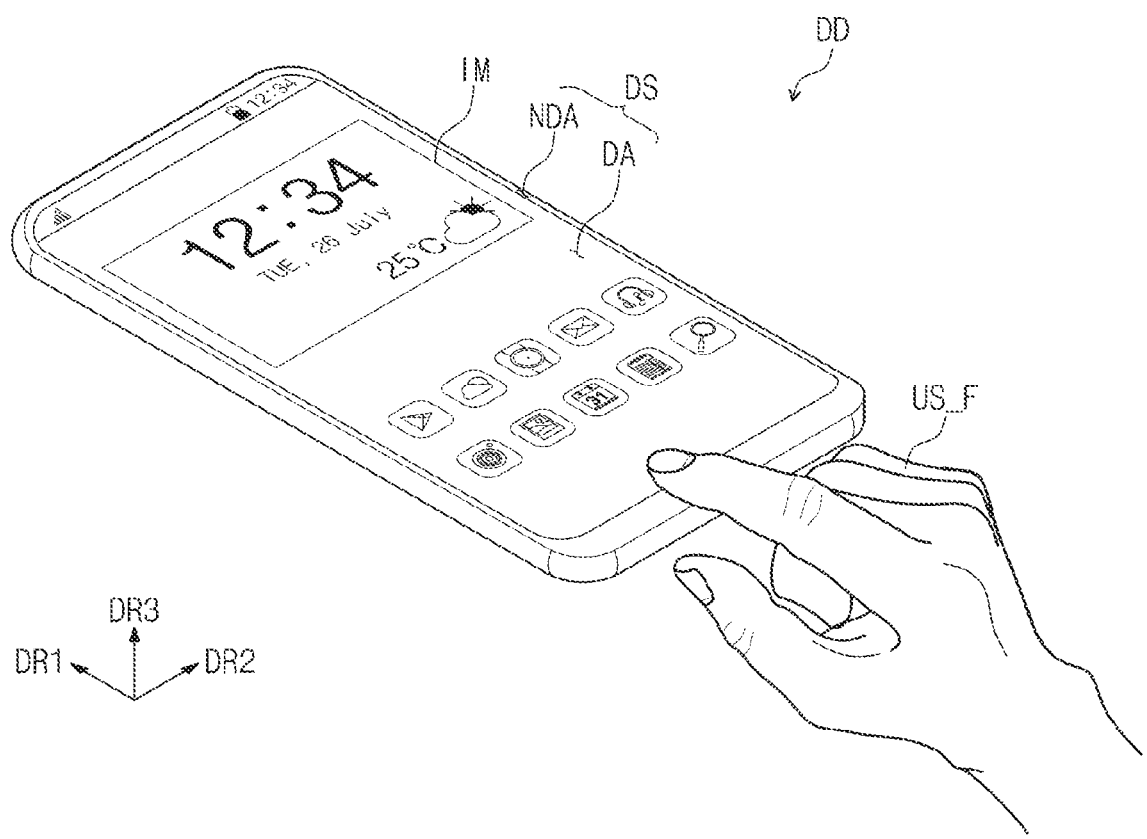
FIG. 1 is a perspective view of a display device including an input sensing part according to an embodiment of the present disclosure.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. In addition, in drawings, thicknesses, proportions, and dimensions of components may be exaggerated to describe the technical features effectively.

The term "and/or" includes one or more combinations of the associated listed items.

The singular forms are intended to include the plural forms unless the context clearly indicates otherwise.

Also, the terms "under", "beneath", "on", "above", etc. are used to describe a relationship between components illustrated in a drawing. The terms are relative and are described with reference to a direction indicated in the drawing.

Below, embodiments of the present disclosure will be described with reference to accompanying drawings.

FIG. 1 is a perspective view of a display device including an input sensing part (e.g., an input sensing device or an input sensor) according to an embodiment of the present disclosure.

Referring to FIG. 1, a display device DD according to an embodiment of the present disclosure may have a shape of a rectangle where long sides (or edges) extend in a first direction DR1 and short sides (or edges) extend in a second direction DR2 intersecting the first direction DR1. However, the present disclosure is not limited thereto. For example, the display device DD may have various shapes such as a circle and a polygon.

Below, a direction that is substantially perpendicular to a plane defined by the first direction DR1 and the second direction DR2 is defined as a third direction DR3. Also, in the specification, the expression "when viewed from above a plane" means a state of being viewed in the third direction DR3. Further, a state of being viewed in the third direction DR3 may be referred to as being view in a plan view.

An upper surface of the display device DD may be defined as a display surface DS and may have a plane defined by the first direction DR1 and the second direction DR2. Images IM generated by the display device DD may be provided to the user through the display surface DS. The display device DD may sense the user's touch made through the user's hand US_F.

The display surface DS may include a display area DA and a non-display area NDA around the display area DA. The display area DA may display an image, and the non-display area NDA may not display an image. The non-display area NDA may surround the display area DA and may define a border of the display device DD printed with a given color.

Figure 2:
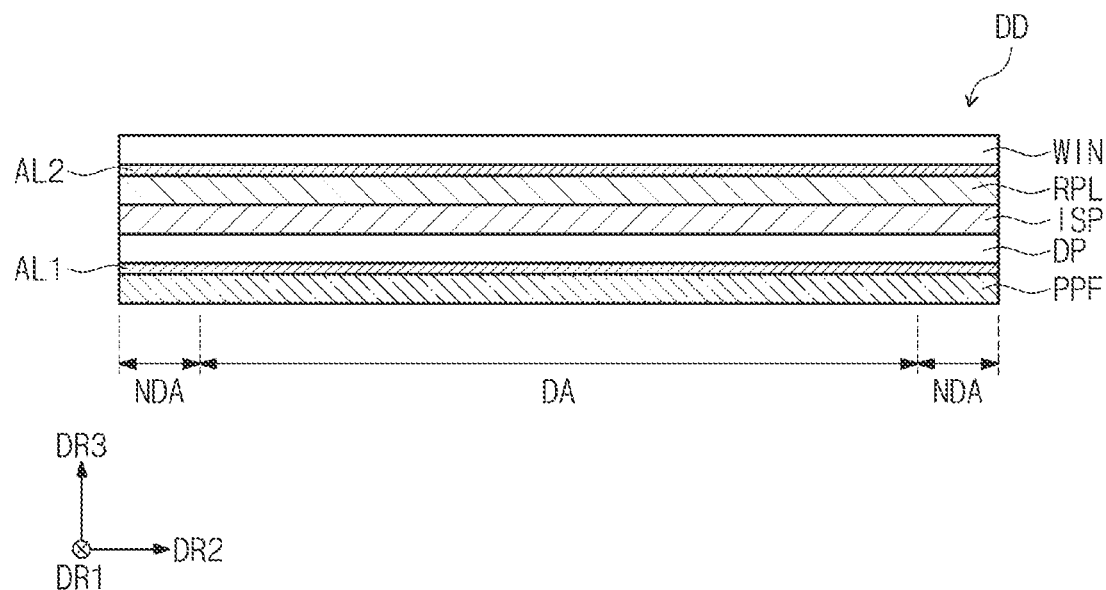
FIG. 2 is a diagram illustrating a cross-section of a display device illustrated in FIG. 1 according to an embodiment of the present disclosure.

FIG. 2 is a diagram illustrating a cross-section of a display device illustrated in FIG. 1.

In an embodiment, the cross-section of the display device DD, which is viewed in the first direction DR1, is illustrated in FIG. 2.

Referring to FIG. 2, the display device DD may include a display panel DP, an input sensing part ISP, a reflection preventing layer RPL, a window WIN, a panel protecting film PPF, and first and second adhesive layers AL1 to AL2.

The display panel DP may be a flexible display panel. The display panel DP according to an embodiment of the present disclosure may be a light-emitting display panel, but is not particularly limited thereto. For example, the display panel DP may be an organic light-emitting display panel or an inorganic light-emitting display panel. An emission layer of the organic light-emitting display layer may include an organic light-emitting material. An emission layer of the inorganic light-emitting display panel may include a quantum dot, a quantum rod, or the like. Below, the description will be given under the condition that the display panel DP is an organic light-emitting display panel.

The input sensing part ISP (e.g., an input sensor) may be disposed on the display panel DP. The input sensing part ISP may include a plurality of sensors for sensing an external input in a capacitive scheme. The input sensing part ISP may be manufactured directly on the display panel DP when the display device DD is manufactured. However, the present disclosure is not limited thereto. For example, the input sensing part ISP may be manufactured with a panel independent of the display panel DP and may then be attached to the display panel DP by an adhesive layer.

The reflection preventing layer RPL may be disposed on the input sensing part ISP. The reflection preventing layer RPL may be manufactured directly on the input sensing part ISP when the display device DD is manufactured. However, the present disclosure is not limited thereto. For example, the reflection preventing layer RPL may be manufactured with a separate panel and may then be attached to the display panel DP by an adhesive layer.

The reflection preventing layer RPL may be a film for preventing an external light from being reflected. The reflection preventing layer RPL may reduce the reflectance of the external light incident to the display panel DP from above the display device DD. The reflection preventing layer RPL may prevent the external light from being visually perceived by the user.

When the external light traveling toward the display panel DP is reflected from the display panel DP and is again provided to an external user, like a mirror, the user may visually perceive the external light. To prevent the above phenomenon, in an embodiment, the reflection preventing layer RPL may include a plurality of color filters displaying the same color as pixels of the display panel DP.

The color filters may filter the external light with the same color as the pixels. In this case, the external light may not be visually perceived by the user. However, the present disclosure is not limited thereto. For example, the reflection preventing layer RPL may include a retarder and/or a polarizer for the purpose of reducing the reflectance of the external light.

The window WIN may be disposed on the reflection preventing layer RPL. The window WIN may protect the display panel DP, the input sensing part ISP, and the reflection preventing layer RPL from external scratches and impacts. The window WIN may include a transparent material such as glass or plastic (e.g., flexible plastic).

The panel protecting film PPF may be disposed under the display panel DP. The panel protecting film PPF may protect a bottom surface of the display panel DP. The panel protecting film PPF may include a flexible plastic material such as polyethyleneterephthalate (PET).

The first adhesive layer AL1 may be disposed between the display panel DP and the panel protecting film PPF, and the display panel DP and the panel protecting film PPF may be tightly coupled to each other by the first adhesive layer AL1. The second adhesive layer AL2 may be disposed between the window WIN and the reflection preventing layer RPL, and the window WIN and the reflection preventing layer RPL may be tightly coupled to each other by the second adhesive layer AL2.

Figure 3:
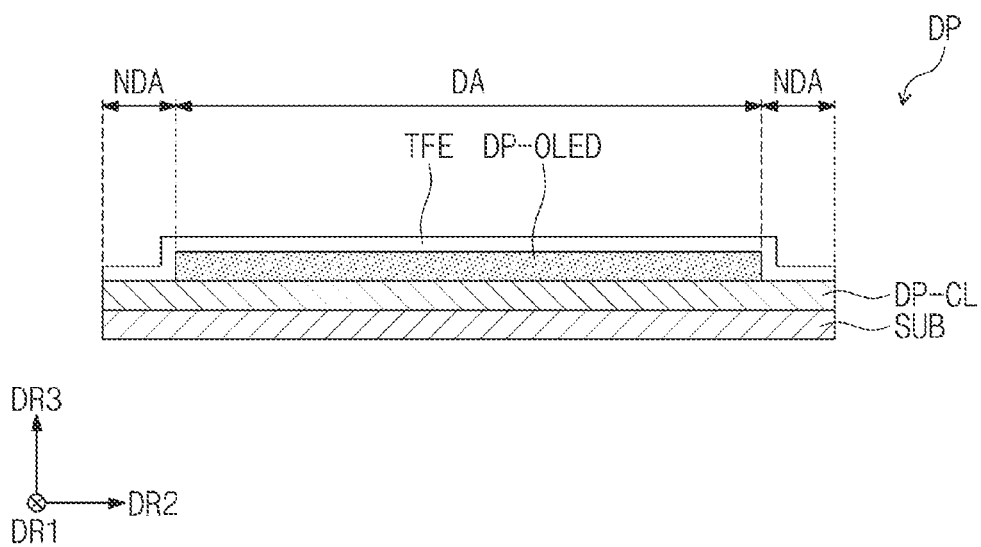
FIG. 3 is a view illustrating a cross-section of a display panel illustrated in FIG. 2 according to an embodiment of the present disclosure.

FIG. 3 is a view illustrating a cross-section of a display panel illustrated in FIG. 2.

In an embodiment, the cross-section of the display panel DP, which is viewed in the first direction DR1, is illustrated in FIG. 3.

Referring to FIG. 3, the display panel DP may include a substrate SUB, a circuit element layer DP-CL disposed on the substrate SUB, a display element layer DP-OLED disposed on the circuit element layer DP-CL, and a thin film encapsulation layer TFE disposed on the display element layer DP-OLED.

The substrate SUB may include the display area DA and the non-display area NDA around the display area DA. The substrate SUB may include a flexible plastic material such as glass or polyimide (PI). The display element layer DP-OLED may be disposed in the display area DA.

A plurality of pixels may be disposed in the circuit element layer DP-CL and the display element layer DP-OLED. Each of the pixels may include transistors disposed in the circuit element layer DP-CL and a light emitting device disposed in the display element layer DP-OLED and connected with the transistors.

The thin film encapsulation layer TFE may be disposed on the circuit element layer DP-CL so as to cover the display element layer DP-OLED. The thin film encapsulation layer TFE may protect the pixels from moisture, oxygen, and external foreign material.

Figure 4:
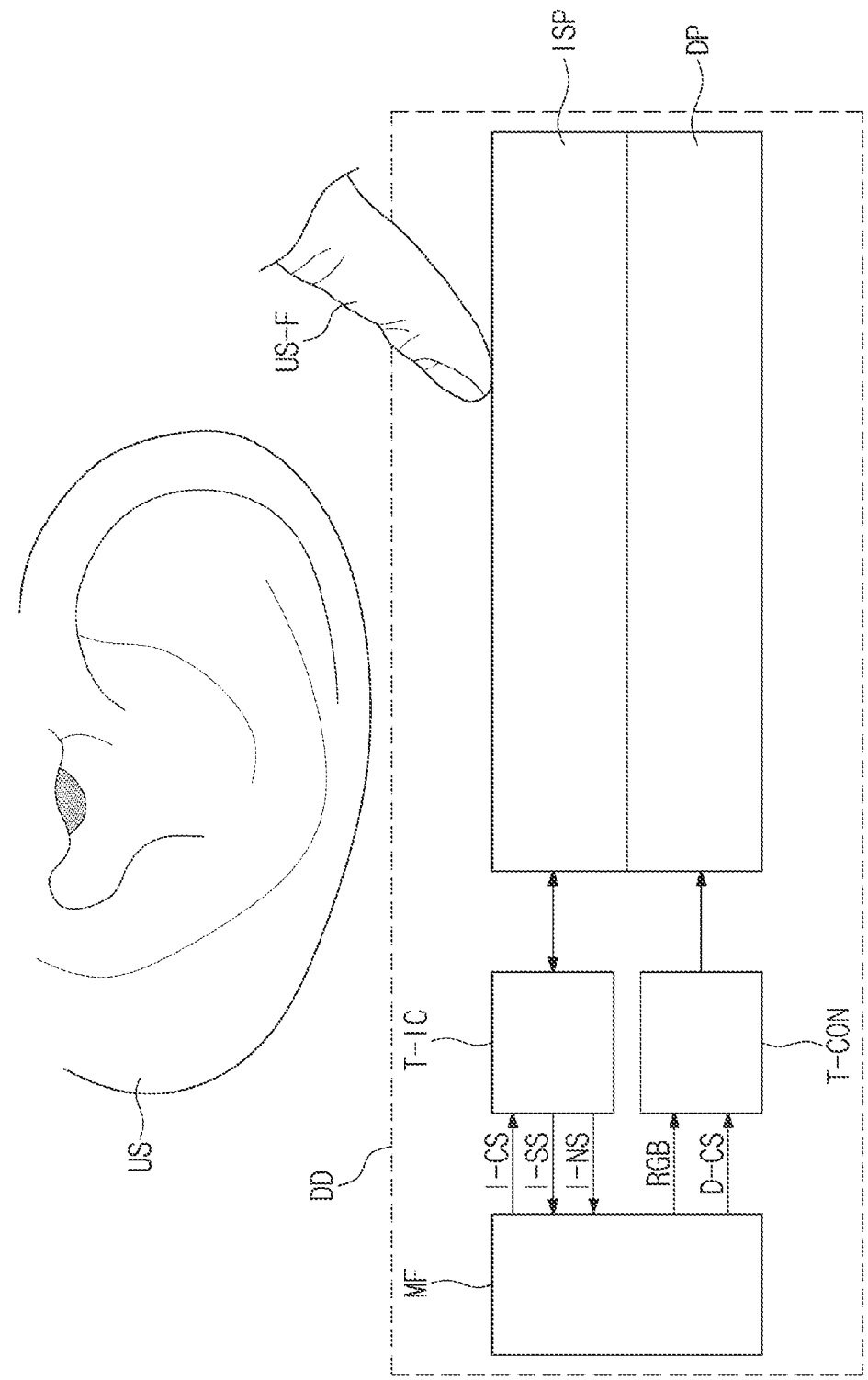
FIG. 4 is a block diagram of a display device illustrated in FIG. 1 according to an embodiment of the present disclosure.

FIG. 4 is a block diagram of a display device illustrated in FIG. 1.

Referring to FIG. 4, the display device DD may include the display panel DP, the input sensing part ISP, a timing controller T-CON (e.g., a control circuit), a sensing control part T-IC (e.g., a logic circuit), and a main processor MF.

The main processor MF may control an overall operation of the display device DD. For example, the main processor MF may control operations of the timing controller T-CON and the sensing control part T-IC. The main processor MF may include at least one microprocessor. Also, the main processor MF may further include a graphics processor. The main processor MF may be referred to as an "application processor" or a "main processor".

The timing controller T-CON may control the display panel DP. The timing controller T-CON may receive image data RGB and a control signal D-CS from the main processor MF. The control signal D-CS may include various signals. For example, the control signal D-CS may include an input vertical synchronization signal, an input horizontal synchronization signal, a main clock signal, a data enable signal, and the like. The timing controller T-CON may generate signals for controlling the driving timing of the display panel DP based on the control signal D-CS.

The sensing control part T-IC may control the input sensing part ISP. The sensing control part T-IC may receive a control signal I-CS from the main processor MF. The control signal I-CS may include a mode decision signal determining a driving mode of the sensing control part T-IC and a clock signal.

When the user's hand US_F directly touches the input sensing part ISP, the sensing control part T-IC may calculate coordinate information of the input based on a sensing signal received from the input sensing part ISP and may provide the main processor MF with a coordinate signal I-SS including the coordinate information. The coordinate information may include a position or coordinates of the touch. The main processor MF may perform an operation corresponding to the user input based on the coordinate signal I-SS. For example, the main processor MF may drive the timing controller T-CON such that a new application image is displayed on the display panel DP.

When the user US comes close to the input sensing part ISP, a signal I-NS generated by the sensing control part T-IC depending on proximity sensing may be provided to the main processor MF. The main processor MF may receive and process the signal I-NS to generate a processing result and may determine a proximity state based on the processing result.

Depending on the proximity state of the user US, the main processor MF may drive the timing controller T-CON such that the luminance of the image displayed in the display panel DP decreases or an image is not displayed in the display panel DP. That is, the main processor MF may turn off the display panel DP. For example, when the proximity state indicates the user US is within a certain distance from a surface of the display panel, timing controller T-CON may decrease the luminance, turn off the display panel DP, etc. The above operation may be performed in a call mode (e.g., while a user is engaged in a telephone call), which will be described in detail below.

Figure 5:
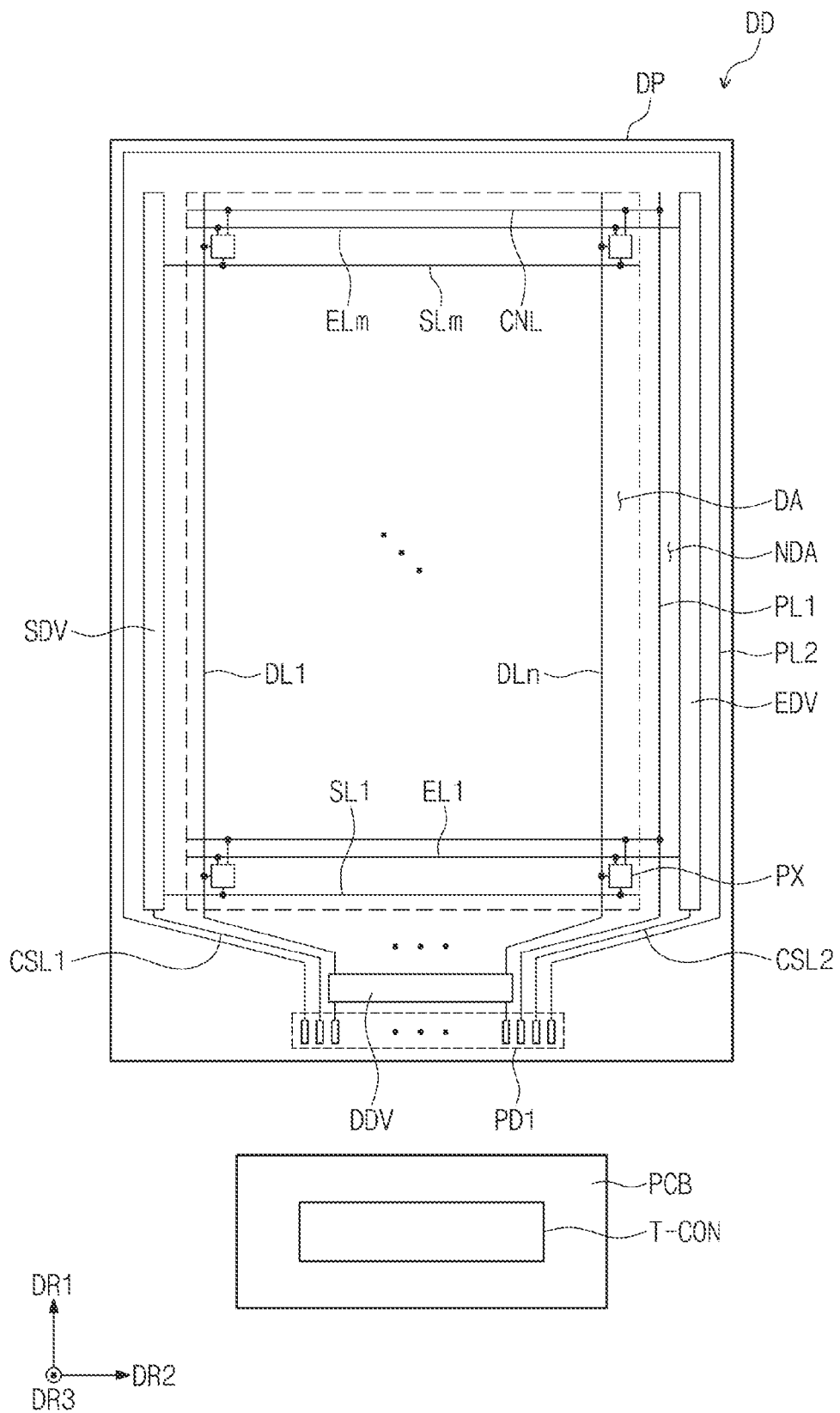
FIG. 5 is a plan view of a display panel illustrated in FIG. 2 according to an embodiment of the present disclosure.

FIG. 5 is a plan view of a display panel illustrated in FIG. 2.

Referring to FIG. 5, the display device DD may include the display panel DP, a scan driver SDV (e.g., a driver circuit), a data driver DDV (e.g., a driver circuit), a light emission driver EDV (e.g., a driver circuit), a printed circuit board PCB, the timing controller T-CON, and a plurality of first pads PD1.

The display panel DP may be in the shape of a rectangle where long sides (or edges) extend in the first direction DR1 and short sides (or edges) extend in the second direction DR2. However, the shape of the display panel DP is not limited thereto. The display panel DP may include the display area DA and the non-display area NDA around the display area DA.

The display panel DP may include a plurality of pixels PX, a plurality of scan lines SL1 to SLm, a plurality of data lines DL1 to DLn, a plurality of emission lines EL1 to ELm, first and second control lines CSL1 and CSL2, first and second power lines PL1 and PL2, and connection lines CNL. Herein, "m" and "n" are natural numbers.

The pixels PX may be disposed in the display area DA. The scan driver SDV and the light emission driver EDV may be disposed in the non-display area NDA so as to be adjacent to the respective long sides of the display panel DP. The data driver DDV may be disposed in the non-display area NDA so as to be adjacent to one of the short sides of the display panel DP. When viewed from above a plane, the data driver DDV may be adjacent to a bottom (or lower) end of the display panel DP.

The scan lines SL1 to SLm may extend in the second direction DR2 and may be connected with the pixels PX and the scan driver SDV. The data lines DL1 to DLn may extend in the first direction DR1 and may be connected with the pixels PX and the data driver DDV. The emission lines EL1 to ELm may extend in the second direction DR2 and may be connected with the pixels PX and the light emission driver EDV.

The first power line PL1 may extend in the first direction DR1 and may be disposed in the non-display area NDA. The first power line PL1 may be disposed between the display area DA and the light emission driver EDV, but is not limited thereto. For example, the first power line PL1 may be disposed between the display area DA and the scan driver SDV.

The connection lines CNL may extend in the second direction DR2, may be arranged in the first direction DR1, and may be connected with the first power line PL1 and the pixels PX. A first voltage may be applied to the pixels PX through the first power line PL1 and the connection lines CNL that are connected to each other.

The second power line PL2 may be disposed in the non-display area NDA and may extend along the long sides of the display panel DP and one short side of the display panel DP, at which the data driver DDV is not disposed. The second power line PL2 may be disposed to be closer to the outside than the scan driver SDV and the light emission driver EDV.

The second power line PL2 may extend toward the display area DA and may be connected with the pixels PX. A second voltage that is lower in level than the first voltage may be applied to the pixels PX through the second power line PL2.

The first control line CSL1 may be connected with the scan driver SDV and may extend toward the bottom end of the display panel DP. The second control line CSL2 may be connected with the light emission driver EDV and may extend toward the bottom end of the display panel DP. The data driver DDV may be disposed between the first control line CSL1 and the second control line CSL2.

The first pads PD1 may be disposed in the non-display area NDA so as to be adjacent to the bottom end of the display panel DP and may be closer to the bottom end of the display panel DP than the data driver DDV. The data driver DDV, the first power line PL1, the second power line PL2, the first control line CSL1, and the second control line CSL2 may be connected with the first pads PD1. The data lines DL1 to DLn may be connected with the data driver DDV, and the data driver DDV may be connected with the first pads PD1 corresponding to the data lines DL1 to DLn.

The timing controller T-CON may control the operations of the scan driver SDV, the data driver DDV, and the light emission driver EDV. The timing controller T-CON may be mounted on the printed circuit board PCB. The printed circuit board PCB may be connected with the first pads PD1, and the timing controller T-CON may be connected with the display panel DP through the first pads PD1.

The timing controller T-CON may receive the image data RGB and the control signal D-CS from the main processor MP. The timing controller T-CON may generate image data "DATA" by converting the data format of the image signals RGB so as to be suitable for an interface specification with the data driver DDV. The timing controller T-CON may provide the data driver DDV with the image data "DATA" whose data format is converted.

The timing controller T-CON may generate and output a first control signal, a second control signal, and a third control signal in response to the control signal D-CS. The first control signal may be a scan control signal, the second control signal may be a data control signal, and the third control signal may be an emission control signal.

The first control signal may be provided to the scan driver SDV, the second control signal may be provided to the data driver DDV, and the third control signal may be provided to the light emission driver EDV.

The scan driver SDV may generate a plurality of scan signals in response to the first control signal, and the scan signals may be applied to the pixels PX through the scan lines SL1 to SLm.

The data driver DDV may generate a plurality of data voltages corresponding to the image data "DATA" in response to the second control signal, and the data voltages may be applied to the pixels PX through the data lines DL1 to DLn.

The light emission driver EDV may generate a plurality of emission signals in response to the third control signal, and the emission signals may be applied to the pixels PX through the emission lines EL1 to ELm.

The pixels PX may be provided with the data voltages in response to the scan signals. The pixels PX may display an image by emitting lights of luminance corresponding to the data voltages in response to the emission signals. The emission time of the pixels PX may be controlled by the emission signals.

Figure 6:
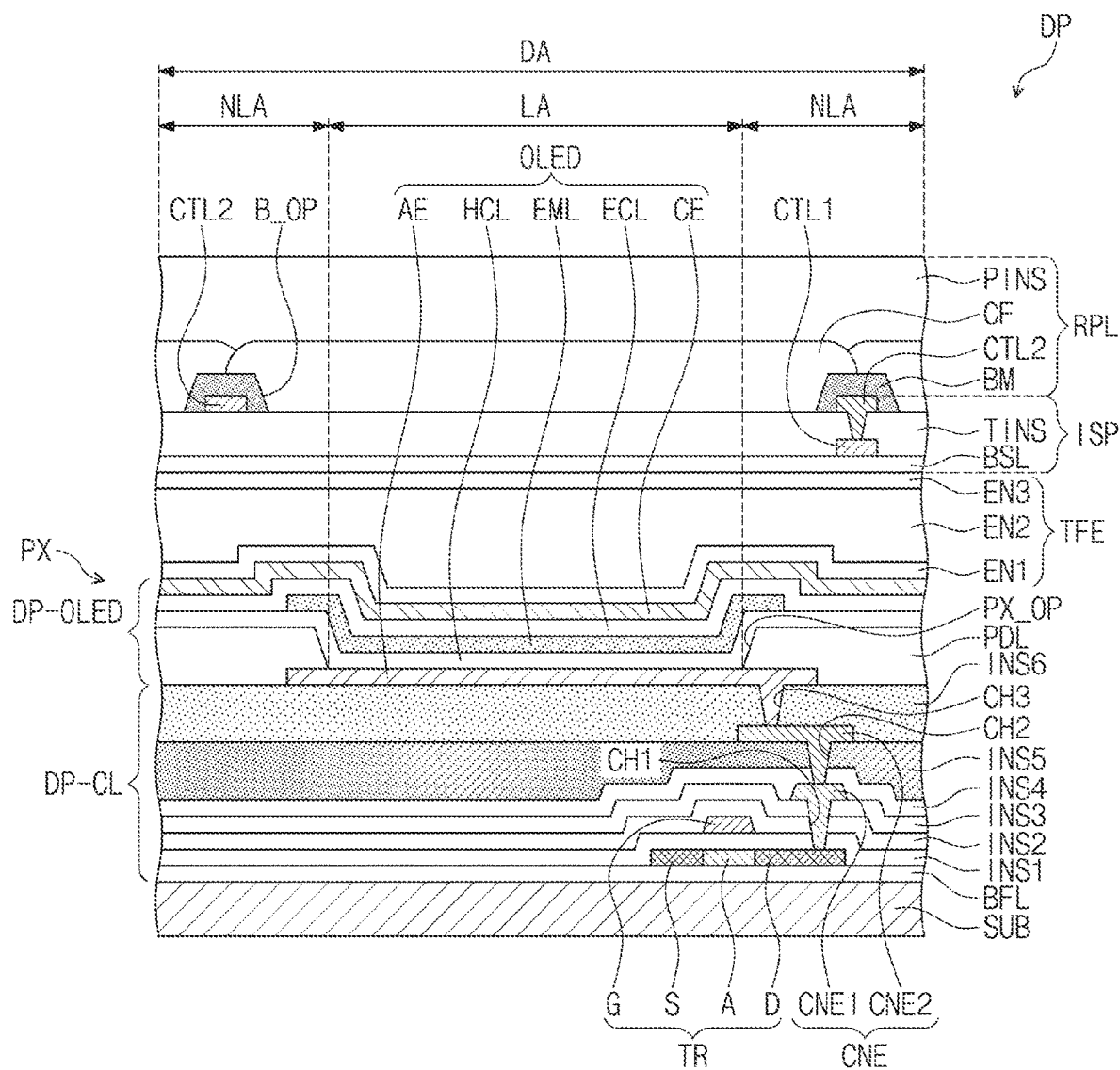
FIG. 6 is a diagram illustrating a cross-section of a display panel corresponding to one pixel illustrated in FIG. 5 according to an embodiment of the present disclosure.

FIG. 6 is a diagram illustrating a cross-section of a display panel corresponding to one pixel illustrated in FIG. 5.

Referring to FIG. 6, the pixel PX may include a transistor TR and a light-emitting element OLED. The light-emitting element OLED may include a first electrode (or anode) AE, a second electrode (or cathode) CE, a hole control layer HCL, an electron control layer ECL, and an emission layer EML.

The transistor TR and the light-emitting element OLED may be disposed on the substrate SUB. In an embodiment, one transistor TR is illustrated. However, substantially, the pixel PX may include a plurality of transistors for driving the light-emitting element OLED and at least one capacitor.

The display area DA may include a light-emitting area LA corresponding to each the pixels PX and a non-light-emitting area NLA around the light-emitting area LA. The light-emitting element OLED may be disposed in the light-emitting area LA.

A buffer layer BFL may be disposed on the substrate SUB, and the buffer layer BFL may be an inorganic layer. A semiconductor pattern may be disposed on the buffer layer BFL. The semiconductor pattern may include polysilicon, amorphous silicon, or metal oxide.

The semiconductor pattern may be doped with an N-type dopant or a P-type dopant. The semiconductor pattern may include a highly doped area and a lightly doped area. Conductivity of the highly doped area may be greater than that of the lightly doped area. The highly doped area may substantially operate as a source electrode or a drain electrode of the transistor TR. The lightly doped area may substantially correspond to an active (or channel) of the transistor TR.

A source S (e.g., source electrode), an active A, and a drain D (e.g., a drain electrode) of the transistor TR may be formed from the semiconductor pattern. A first insulating layer INS1 may be disposed on the semiconductor pattern. A gate G of the transistor TR may be disposed on the first insulating layer INS 1. A second insulating layer INS2 may be disposed on the gate G. A third insulating layer INS3 may be disposed on the second insulating layer INS2.

To connect the transistor TR and the light emitting element OLED, a connection electrode CNE may include a first connection electrode CNE1 and a second connection electrode CNE2. The first connection electrode CNE1 may be disposed on the third insulating layer INS3 and may be connected to the drain D through a first contact hole CH1 defined in the first to third insulating layers INS1 to INS3.

A fourth insulating layer INS4 may be disposed on the first connection electrode CNE1. A fifth insulating layer INS5 may be disposed on the fourth insulating layer INS4. The second connection electrode CNE2 may be disposed on the fifth insulating layer INS5. The second connection electrode CNE2 may be connected to the first connection electrode CNE1 through a second contact hole CH2 defined in the fourth and fifth insulating layers INS4 and INS5.

A sixth insulating layer INS6 may be disposed on the second connection electrode CNE2. Layers from the buffer layer BFL to the sixth insulating layer INS6 may be defined as the circuit element layer DP-CL. The first to sixth insulating layers INS 1 to INS6 may be inorganic layers or organic layers.

The first electrode AE may be disposed on the sixth insulating layer INS6. The first electrode AE may be connected to the second connection electrode CNE2 through a third contact hole CH3 defined in the sixth insulating layer INS6. A pixel defining layer PDL in which an opening PX_OP for exposing a given portion of the first electrode AE is defined may be disposed on the first electrode AE and the sixth insulating layer INS6.

The hole control layer HCL may be disposed on the first electrode AE and the pixel defining layer PDL. The hole control layer HCL may include a hole transport layer and a hole injection layer.

The emission layer EML may be disposed on the hole control layer HCL. The emission layer EML may be disposed in an area corresponding to the opening PX_OP. The emission layer EML may include an organic material and/or an inorganic material. The emission layer EML may generate a light with one of a red color, a green color, and a blue color.

The electron control layer ECL may be disposed on the emission layer EML and the hole control layer HCL. The electron control layer ECL may include an electron transport layer and an electron injection layer. The hole control layer HCL and the electron control layer ECL may be disposed in common in the light-emitting area LA and the non-light-emitting area NLA.

The second electrode CE may be disposed on the electron control layer ECL. The second electrode CE may be disposed in the pixels PX in common. A layer in which the light-emitting element OLED is disposed may be defined as the display element layer DP-OLED.

The thin film encapsulation layer TFE may be disposed on the second electrode CE so as to cover the pixel PX. The thin film encapsulation layer TFE may include a first encapsulation layer EN1 disposed on the second electrode CE, a second encapsulation layer EN2 disposed on the first encapsulation layer EN1, and a third encapsulation layer EN3 disposed on the second encapsulation layer EN2.

Each of the first and third encapsulation layers EN1 and EN3 may include an inorganic insulating layer, and may protect the pixel PX from moisture/oxygen. The second encapsulation layer EN2 includes an organic insulating layer and may protect the pixel PX from foreign objects such as dust particles.

The first voltage may be applied to the first electrode AE through the transistor TR, and the second voltage lower in level than the first voltage may be applied to the second electrode CE. Excitons may be formed by coupling holes and electrons injected into the emission layer EML. As the excitons transition to a ground state, the light-emitting element OLED may emit light.

The input sensing part ISP (e.g., an input sensor) may be disposed on the thin film encapsulation layer TFE. The input sensing part ISP may be manufactured directly on the thin film encapsulation layer TFE.

A base layer BSL may be disposed on the thin film encapsulation layer TFE. The base layer BSL may include an inorganic insulating layer. As the base layer BSL, at least one or more inorganic insulating layers may be provided on the thin film encapsulation layer TFE.

The input sensing part ISP may include a first conductive pattern CTL1 and a second conductive pattern CTL2 disposed on the first conductive pattern CTL1. The first conductive pattern CTL1 may be disposed on the base layer BSL. An insulating layer TINS may be disposed on the base layer BSL to cover the first conductive pattern CTL1. The insulating layer TINS may include an inorganic insulating layer or an organic insulating layer. The second conductive pattern CTL2 may be disposed on the insulating layer TINS.

The first and second conductive patterns CTL1 and CTL2 may overlap each other in the non-light-emitting area NLA. The first and second conductive patterns CTL1 and CTL2 may be disposed in the non-light-emitting area NLA between the light-emitting areas LA and may have a mesh shape.

The first and second conductive patterns CTL1 and CTL2 may form the sensors of the input sensing part ISP described above. For example, the first and second conductive patterns CTL1 and CTL2 of the mesh shape may be separated from each other to form the sensors. A portion of the second conductive pattern CTL2 may be connected with the first conductive pattern CTL1. A configuration of the sensors formed by the first and second conductive patterns CTL1 and CTL2 will be described in detail below.

The reflection preventing layer RPL may be disposed on the second conductive pattern CTL2. The reflection preventing layer RPL may include a black matrix BM and a plurality of color filters CF. The black matrix BM may overlap the non-light-emitting area NLA, and the color filters CF may respectively overlap the light-emitting areas LA.

The black matrix BM may be disposed on the insulating layer TINS to cover the second conductive pattern CTL2. An opening B_OP that overlaps the light-emitting area LA and the opening PX_OP may be defined in the black matrix BM. The black matrix BM may absorb and block the light. In an embodiment, a width of the opening B_OP is greater than a width of the opening PX_OP.

The color filters CF may be disposed on the insulating layer TINS and the black matrix BM. The color filters CF may be respectively disposed in the openings B_OP. A planation insulating layer PINS may be disposed on the color filters CF. The planation insulating layer PINS may provide a flat upper surface.

The reflection preventing layer RPL may include the plurality of color filters CF that display the same colors as the pixels PX of the display panel DP. The color filters CF may filter the external light with the same colors as the pixels PX. In this case, the external light may not be visually perceived by the user.

Figure 7:
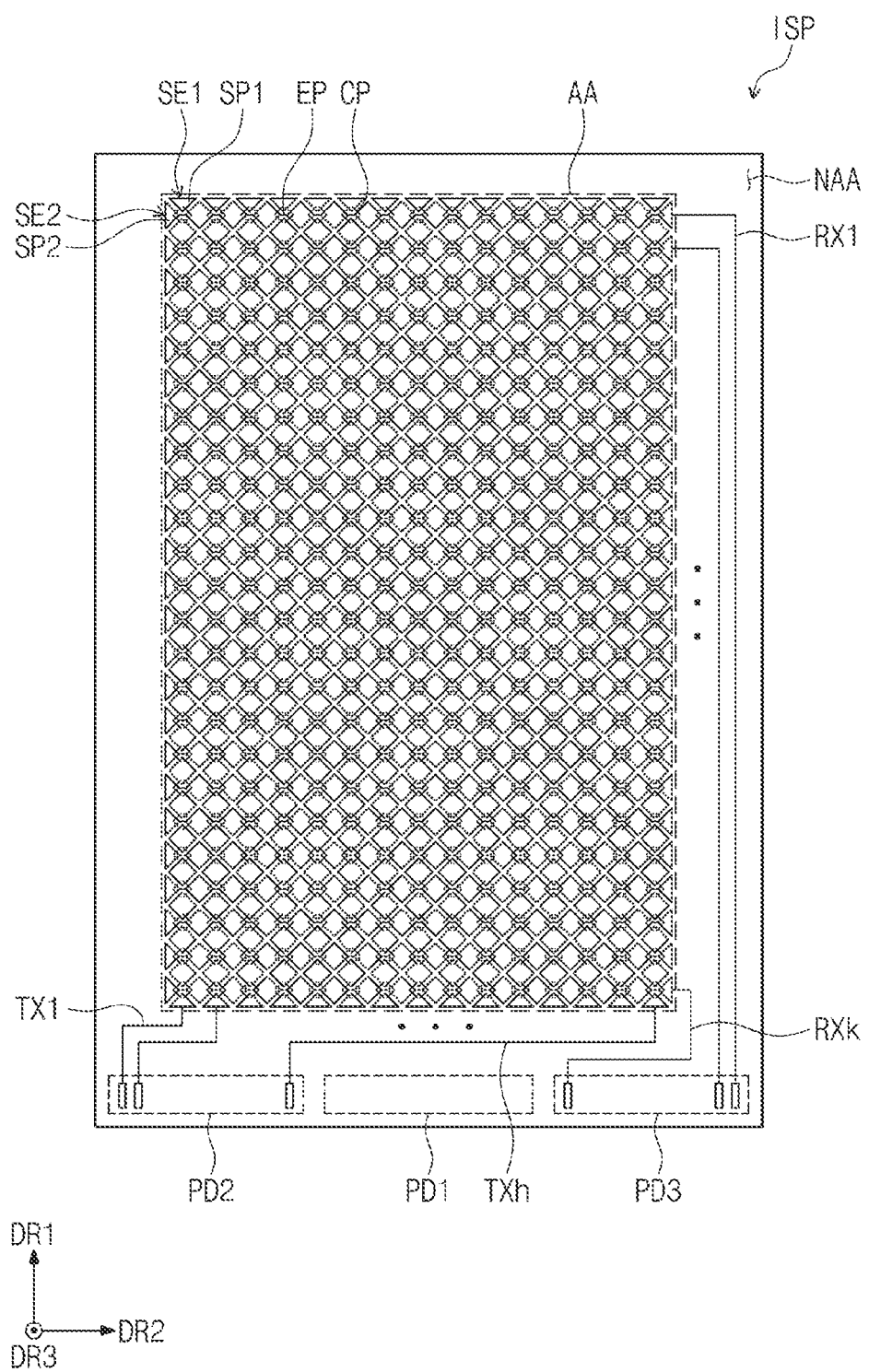
FIG. 7 is a plan view of an input sensing part illustrated in FIG. 2 according to an embodiment of the present disclosure.

FIG. 7 is a plan view of an input sensing part illustrated in FIG. 2.

Referring to FIG. 7, the input sensing part ISP may include a plurality of sensing electrodes SE1 and SE2, a plurality of lines TX1 to TXh and RX1 to RXk (e.g., conductive wire), and a plurality of second and third pads PD2 and PD3 (e.g., conductors). The sensing electrodes SE1 and SE2, the lines TX1 to TXh and RX1 to RXk, and the second and third pads PD2 and PD3 may be disposed on the thin film encapsulation layer TFE.

A planar area of the input sensing part ISP may include an active area AA and a non-active area NAA around the active area AA. The active area AA may overlap the display area DA, and the non-active area NAA may overlap the non-display area NDA.

The sensing electrodes SE1 and SE2 may be disposed in the active area AA, and the second and third pads PD2 and PD3 may be disposed in the non-active area NAA. In a plan view, the second pads PD2 and the third pads PD3 may be adjacent to a lower end of the input sensing part ISP. In a plan view, the first pads PD1 may be disposed between the second pads PD2 and the third pads PD3.

The lines TX1 to TXh and RX1 to RXk may be connected with first ends of the sensing electrodes SE1 and SE2 and may extend to the non-active area NAA so as to be connected with the second and third pads PD2 and PD3. A sensing control part (e.g., a sensing control circuit) for controlling the input sensing part ISP may be connected with the second and third pads PD2 and PD3 through a printed circuit board.

The sensing electrodes SE1 and SE2 may include the plurality of first sensing electrodes SE1 extending in the first direction DR1 and arranged in the second direction DR2, and the plurality of second sensing electrodes SE2 extending in the second direction DR2 and arranged in the first direction DR1. The second sensing electrodes SE2 may be insulated from the first sensing electrodes SE1 and may extend to intersect the first sensing electrodes SE1.

The lines TX1 to TXh and RX1 to RXk may include the plurality of first lines TX1 to TXh connected with the first sensing electrodes SE1 and the plurality of second lines RX1 to RXk connected with the second sensing electrodes SE2. Herein, "h" and "k" are natural numbers. The first lines TX1 to TXh may extend to the non-active area NAA and may be connected with the second pads PD2. The second lines RX1 to RXk may extend to the non-active area NAA and may be connected with the third pads PD3.

In an embodiment, when viewed from above a plane, the first lines TX1 to TXh may be disposed in the non-active area NAA adjacent to a lower side of the active area AA. When viewed from above a plane, the second lines RX1 to RXk may be disposed in the non-active area NAA adjacent to a right side of the active area AA. The first lines TX1 to TXh may be referred to as transmission lines, and the second lines RX1 to RXk may be referred to as sensing lines.

Each of the first sensing electrodes SE1 may include a plurality of first sensing parts SP1 arranged in the first direction DR1 and a plurality of connecting patterns CP connecting the first sensing parts SP1. Each of the connecting patterns CP may be disposed between two first sensing parts SP1 adjacent in the first direction DR1 and may connect the two first sensing parts SP1.

Each of the second sensing electrodes SE2 may include the plurality of second sensing parts SP2 arranged in the second direction DR2 and a plurality of extending patterns EP extended from the second sensing parts SP2. Each of the extending patterns EP may be disposed between two second sensing parts SP2 adjacent in the second direction DR2 and may be extended from the two second sensing parts SP2.

In an embodiment, the first sensing parts SP1 and the second sensing parts SP2 do not overlap each other and are spaced apart from each other. In this case, the first sensing parts SP1 and the second sensing parts SP2 may be alternately arranged. Capacitances may be formed by the first sensing parts SP1 and the second sensing parts SP2. In an embodiment, the extending patterns EP do not overlap the connecting patterns CP.

Figure 8:
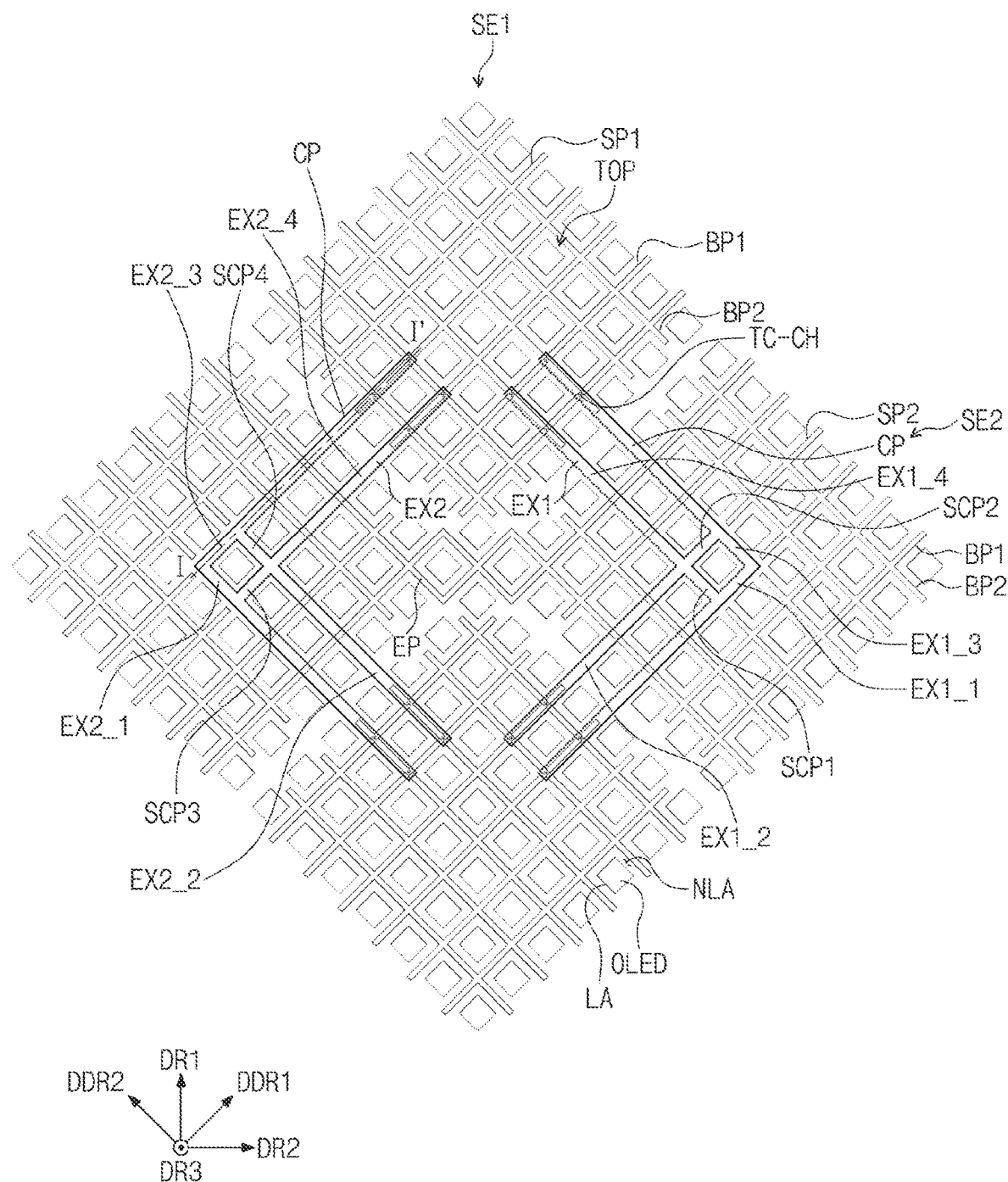
FIG. 8 is an enlarged view of two first sensing parts adjacent to each other and two second sensing parts adjacent to each other, which are illustrated in FIG. 7 according to an embodiment of the present disclosure.

FIG. 8 is an enlarged view of two first sensing parts adjacent to each other and two second sensing parts adjacent to each other, which are illustrated in FIG. 7.

Referring to FIG. 8, the first sensing parts SP1 and the second sensing parts SP2 have a mesh shape. To have the mesh shape, each of the first and second sensing parts SP1 and SP2 may include a plurality of first branch portions BP1 extending in a first diagonal direction DDR1, and a plurality of second branch portions BP2 extending in a second diagonal direction DDR2.

The first diagonal direction DDR1 may be defined as a direction intersecting the first and second directions DR1 and DR2 on a plane defined by the first and second directions DR1 and DR2. The second diagonal direction DDR2 may be defined as a direction intersecting the first diagonal direction DDR1 on the plane defined by the first and second directions DR1 and DR2. In an embodiment, the first direction DR1 and the second direction DR2 cross each other to be perpendicular to each other, and the first diagonal direction DDR1 and the second diagonal direction DDR2 cross each other to be perpendicular to each other.

The first branch portions BP1 of the first and second sensing parts SP1 and SP2 and the second branch portions BP2 of the first and second sensing parts SP1 and SP2 may cross each other and may be integrally formed with each other. Rhombus-shaped touch openings TOP may be defined by the first branch portions BP1 and the second branch portions BP2.

When viewed from above a plane or in a plan view, light-emitting areas LA may be disposed within the touch openings TOP. The light-emitting elements OLED may be disposed in the light-emitting areas LA. Each of the light-emitting areas LA may correspond to the light-emitting area LA illustrated in FIG. 6. The first and second sensing parts SP1 and SP2 may be disposed in the non-light-emitting area NLA. Because the first and second sensing parts SP1 and SP2 are disposed in the non-light-emitting area NLA, the light generated in the light-emitting areas LA may be output normally without the influence of the first and second sensing parts SP1 and SP2.

The connecting pattern CP may extend such that the connecting pattern CP does not overlap the extending pattern EP and may connect the first sensing parts SP1. The connecting pattern CP may be connected with the first sensing parts SP1 through a plurality of contact holes TC-CH. The structure of the contact holes TC-CH will be described with reference to FIG. 9. The connecting pattern CP may extend toward the first sensing parts SP1 through areas overlapping the second sensing parts SP2.

The extending pattern EP may be disposed between the first sensing parts SP1 and may be extended from the second sensing parts SP2. The second sensing parts SP2 and the extending pattern EP may be integrally formed. In an embodiment, the extending pattern EP has a mesh shape. The extending pattern EP, the first sensing parts SP1, and the second sensing parts SP2 may be disposed in the same layer, may be formed of the same material, and may be simultaneously patterned.

The connecting pattern CP may include a first extension part EX1 and a second extension part EX2 being symmetrical in shape to the first extension part EX1. The extending pattern EP may be disposed between the first extension part EX1 and the second extension part EX2.

The first extension part EX1 may extend through an area overlapping one second sensing part SP2 among the second sensing parts SE2 and may be connected with the first sensing parts SP1. The second extension part EX2 may extend through an area overlapping another second sensing part SP2 among the second sensing parts SP2 and may be connected with the first sensing parts SP1.

Below, the first sensing parts SP1 are defined as a first upper sensing part SP1 and a first lower sensing part SP1 depending on a relative placement location. Also, the second sensing parts SP2 are defined as a second left sensing part SP2 and a second right sensing part SP2 depending on a relative placement location.

Portions of the first and second extension parts EX1 and EX2, which are adjacent to one sides of the first and second extension parts EX1 and EX2, may be connected with the first lower sensing part SP1 through the plurality of contact holes TC-CH. Portions of the first and second extension parts EX1 and EX2, which are adjacent to opposite sides of the first and second extension parts EX1 and EX2, may be connected with the first upper sensing part SP1 through the plurality of contact holes TC-CH.

The first extension part EX1 may include a first sub extension part EX1_1 and a second sub extension part EX1_2, which extend in the first diagonal direction DDR1, a third sub extension part EX1_3 and a fourth sub extension part EX1_4, which extend in the second diagonal direction DDR2, a first sub conductive pattern SCP1 extending in the second diagonal direction DDR2, and a second sub conductive pattern SCP2 extending in the first diagonal direction DDR1.

Portions of first and second sub extension parts EX1_1 and EX1_2, which are adjacent to one sides of the first and second sub extension parts EX1_1 and EX1_2, may be connected with the first lower sensing part SP1 through the plurality of contact holes TC-CH. Portions of third and fourth sub extension parts EX1_3 and EX1_4, which are adjacent to one sides of the third and fourth sub extension parts EX1_3 and EX1_4, may be connected with the first upper sensing part SP1 through the plurality of contact holes TC-CH.

An opposite side of the first sub extension part EX1_1 may be extended from an opposite side of the third sub extension part EX1_3, and an opposite side of the second sub extension part EX1_2 may be extended from an opposite side of the fourth sub extension part EX1_4. The first sub conductive pattern SCP1 may be extended from the opposite side of the fourth sub extension part EX1_4 in the second diagonal direction DDR2 and may be extended to the first sub extension part EX1_1. The second sub conductive pattern SCP2 may be extended from the opposite side of the second sub extension part EX1_2 in the first diagonal direction DDR1 and may be extended to the third sub extension part EX1_3.

The first sub extension part EX1_1, the second sub extension part EX1_2, the third sub extension part EX1_3, the fourth sub extension part EX1_4, the first sub conductive pattern SCP1, and the second sub conductive pattern SCP2 may be integrally formed. For example, a single unitary shape may include the first sub extension part EX1_1, the second sub extension part EX1_2, the third sub extension part EX1_3, the fourth sub extension part EX1_4, the first sub conductive pattern SCP1, and the second sub conductive pattern SCP2.

The first and second sub extension parts EX1_1 and EX1_2 may extend to intersect a given number of second branch portions BP2, which are adjacent to the first lower sensing part SP1, from among the second branch portions BP2 of the second right sensing part SP2. In an embodiment, the first branch portions BP1 of the second right sensing part SP2 are not disposed in some areas overlapping the first and second sub extension parts EX1_1 and EX1_2 and the second sub conductive pattern SCP2.

The third and fourth sub extension parts EX1_3 and EX1_4 may extend to intersect a given number of first branch portions BP1, which are adjacent to the first upper sensing part SP1, from among the first branch portions BP1 of the second right sensing part SP2. In an embodiment, the second branch portions BP2 of the second right sensing part SP2 are not disposed in some areas overlapping the third and fourth sub extension parts EX1_3 and EX1_4 and the first sub conductive pattern SCP1.

The second extension part EX2 may include a fifth sub extension part EX2_1 and a sixth sub extension part EX2_2, which extend in the second diagonal direction DDR2, a seventh sub extension part EX2_3 and an eighth sub extension part EX2_4, which extend in the first diagonal direction DDR1, a third sub conductive pattern SCP3 extending in the first diagonal direction DDR1, and a fourth sub conductive pattern SCP4 extending in the second diagonal direction DDR2.

The second left sensing part SP2 may be symmetrical in structure to the second right sensing part SP2, and the second extension part EX2 may be symmetrical in structure to the first extension part EX1. Accordingly, below, additional description associated with the fifth to eighth sub extension parts EX2_1 to EX2_4 and the third and fourth sub conductive patterns SCP3 and SCP4 will be omitted to avoid redundancy.

Figure 9:
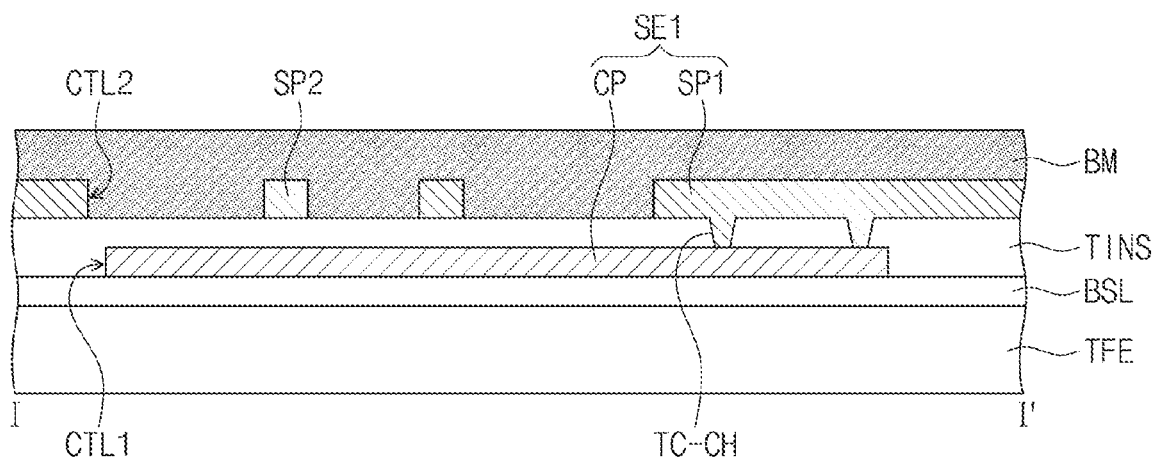
FIG. 9 is a cross-sectional view taken along line I-I' of FIG. 8 according to an embodiment of the present disclosure.

FIG. 9 is a cross-sectional view taken along line I-I' of FIG. 8.

Referring to FIGS. 8 and 9, the base layer BSL may be disposed on the thin film encapsulation layer TFE. The connecting pattern CP may be disposed on the base layer BSL. The insulating layer TINS may be disposed on the connecting pattern CP and the base layer BSL. The insulating layer TINS may be disposed on the base layer BSL to cover the connecting pattern CP. The insulating layer TINS may include an inorganic insulating layer or an organic insulating layer.

The first sensing parts SP1 (e.g., first sensing electrodes) and the second sensing parts SP2 (e.g., second sensing electrodes) may be disposed on the insulating layer TINS. The extending pattern EP integrally formed with the second sensing parts SP2 may also be disposed on the insulating layer TINS. In an embodiment, the connecting pattern CP is connected with the first sensing parts SP1 through the plurality of contact holes TC-CH defined in the insulating layer TINS. The black matrix BM may be disposed on the first and second sensing parts SP1 and SP2 and the insulating layer TINS. In an embodiment, the planation insulating layer PINS described above is omitted in FIG. 9.

The first and second sensing parts SP1 and SP2 and the extending patterns EP may be formed by the second conductive pattern CTL2. The connecting patterns CP may be formed by the first conductive pattern CTL1.

Figure 10:
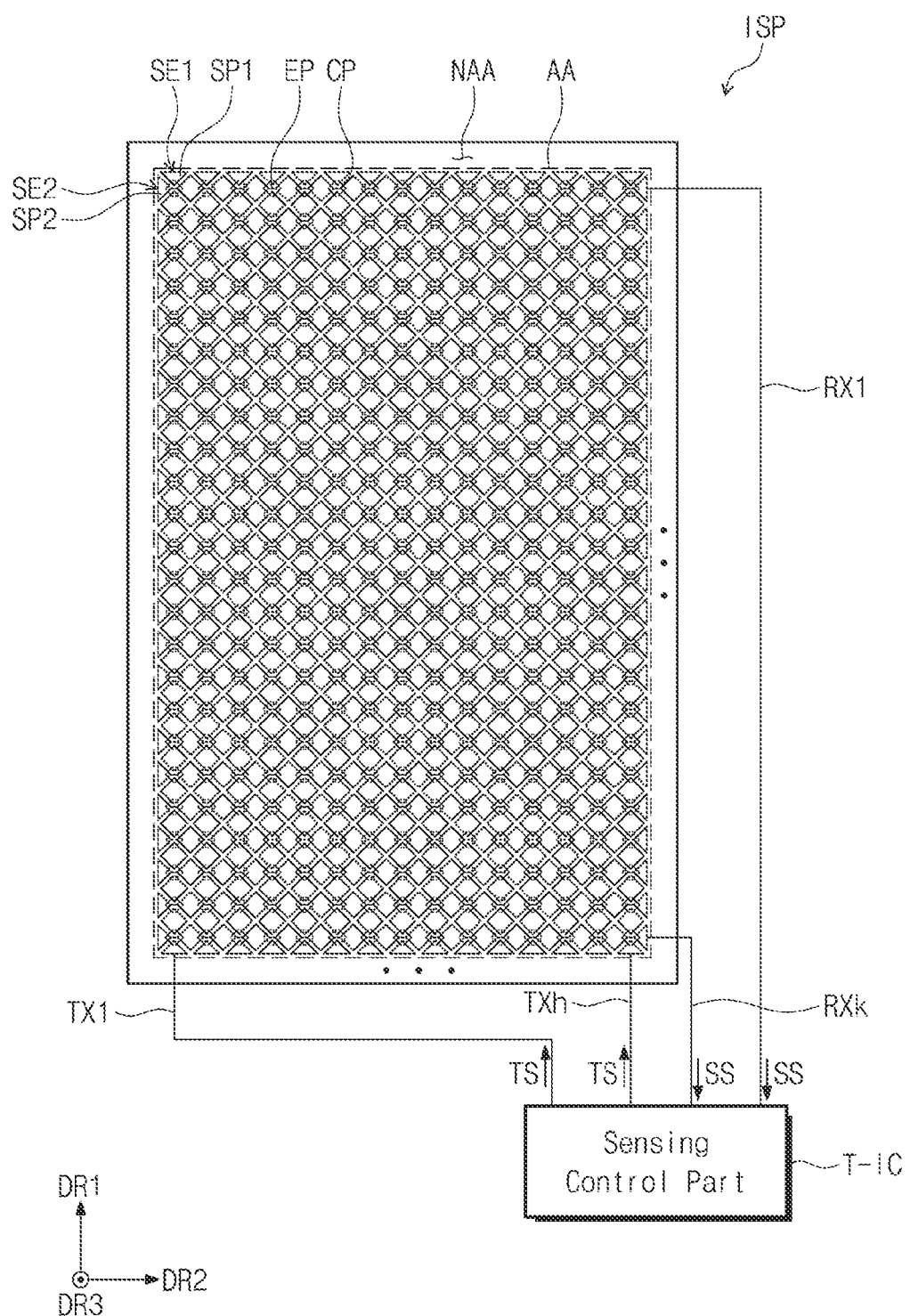
FIG. 10 is a diagram for describing an operation of a mutual sensing mode of an input sensing part illustrated in FIG. 7 according to an embodiment of the present disclosure.
Figure 11:
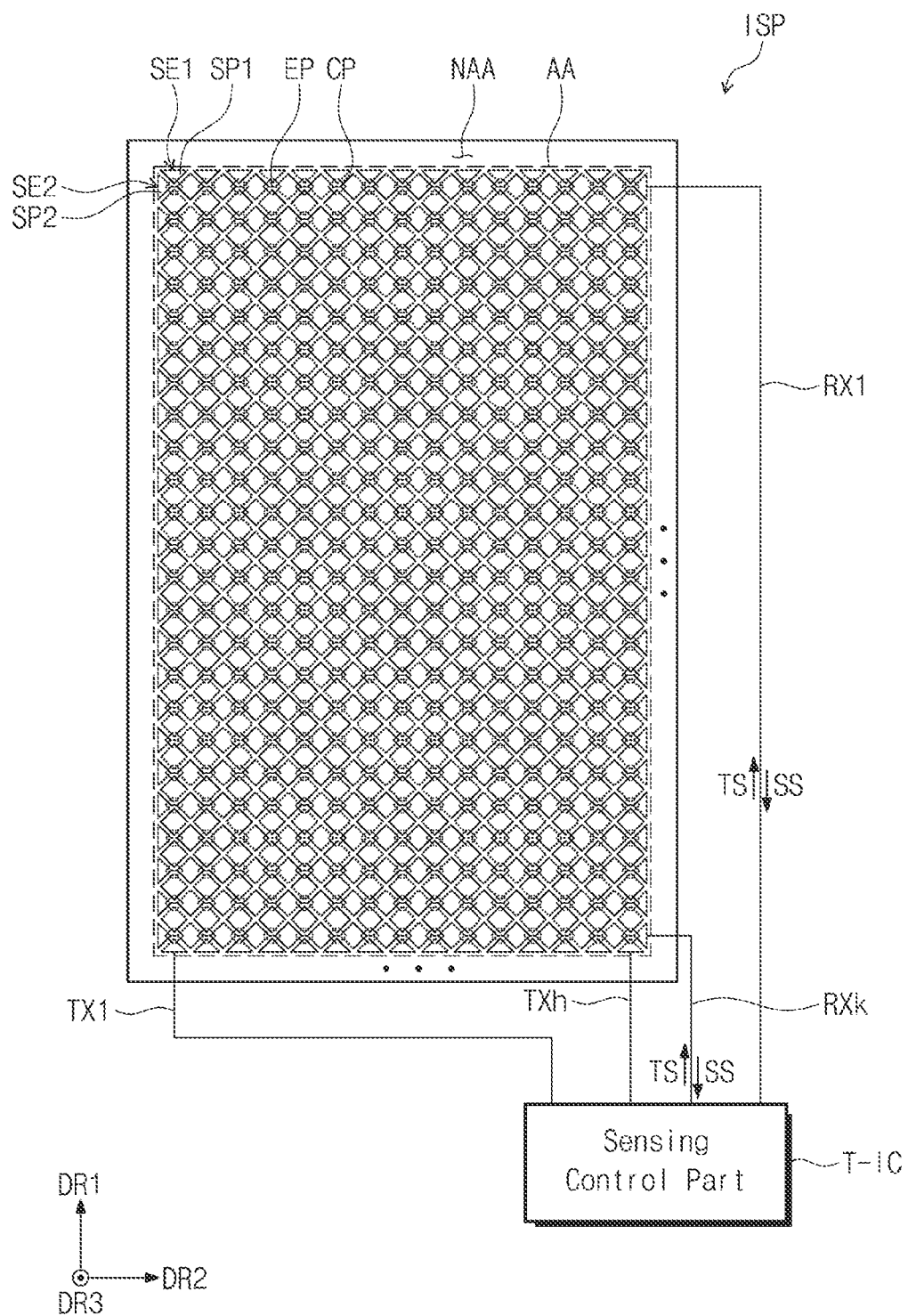
FIG. 11 is a diagram for describing an operation of a self-sensing mode of an input sensing part illustrated in FIG. 7 according to an embodiment of the present disclosure.

FIG. 10 is a diagram for describing an operation of a mutual sensing mode of an input sensing part illustrated in FIG. 7. FIG. 11 is a diagram for describing an operation of a self-sensing mode of an input sensing part illustrated in FIG. 7.

In an embodiment, compared to FIG. 7, the non-active area NAA of FIGS. 10 and 11 is scaled down, and the first and second lines TX1 to TXh and RX1 to RXk are illustrated in a state where the first and second lines TX1 to TXh and RX1 to RXk extend to the outside of the input sensing part ISP and are connected with the sensing control part T-IC.

Referring to FIGS. 10 and 11, the input sensing part ISP may be connected with the sensing control part T-IC controlling the operation of the input sensing part ISP. The first lines TX1 to TXh may extend to the outside and may be connected with the sensing control part T-IC. The second lines RX1 to RXk may extend to the outside and may be connected with the sensing control part T-IC.

The input sensing part ISP may be driven in the mutual sensing mode or the self-sensing mode by the sensing control part T-IC. The mutual sensing mode and the self-sensing mode may be repeatedly performed.

Referring to FIG. 10, the sensing control part T-IC may allow the input sensing part ISP to operate in the mutual sensing mode. The mutual sensing mode may include a driving mode and a sensing mode. In the driving mode of the mutual sensing mode, the sensing control part T-IC may generate a driving signal TS and may apply the driving signal TS to the first lines TX1 to TXh. The driving signal TS may be applied to the first sensing electrodes SE1 through the first lines TX1 to TXh. The driving signal TS may be sequentially applied to the first lines TX1 to TXh.

In the sensing mode of the mutual sensing mode, the user touch may be sensed by the first and second sensing electrodes SE1 and SE2. A sensing signal SS sensed in the sensing mode may be output through the second lines RX1 to RXk and may be provided to the sensing control part T-IC. The sensing control part T-IC may obtain coordinates corresponding to a location of the user touch by using the sensing signal SS. The mutual sensing mode of the input sensing part ISP may be performed by the above operation.

Referring to FIG. 11, the sensing control part T-IC may allow the input sensing part ISP to operate in the self-sensing mode. The self-sensing mode may include a driving mode and a sensing mode. In the driving mode of the self-sensing mode, the sensing control part T-IC may apply the driving signal TS to the second lines RX1 to RXk. The driving signal TS may be applied to the second sensing electrodes SE2 through the second lines RX1 to RXk.

In the sensing mode of the self-sensing mode, the user touch may be sensed, and the sensing signal SS associated with the sensed user touch may be output through the second lines RX1 to RXk and may be provided to the sensing control part T-IC. The self-sensing mode of the input sensing part ISP may be performed by the above operation.

In an embodiment, an operation where the input/output of the driving signal TS and the sensing signal SS is made through the second lines RX1 to RXk in the self-sensing mode is described, but the present disclosure is not limited thereto. For example, the driving signal TS may be applied to the first sensing electrodes SE1 through the first lines TX1 to TXh, and the sensing signal SS may be output through the first lines TX1 to TXh and may be provided to the sensing control part T-IC.

Figure 12:
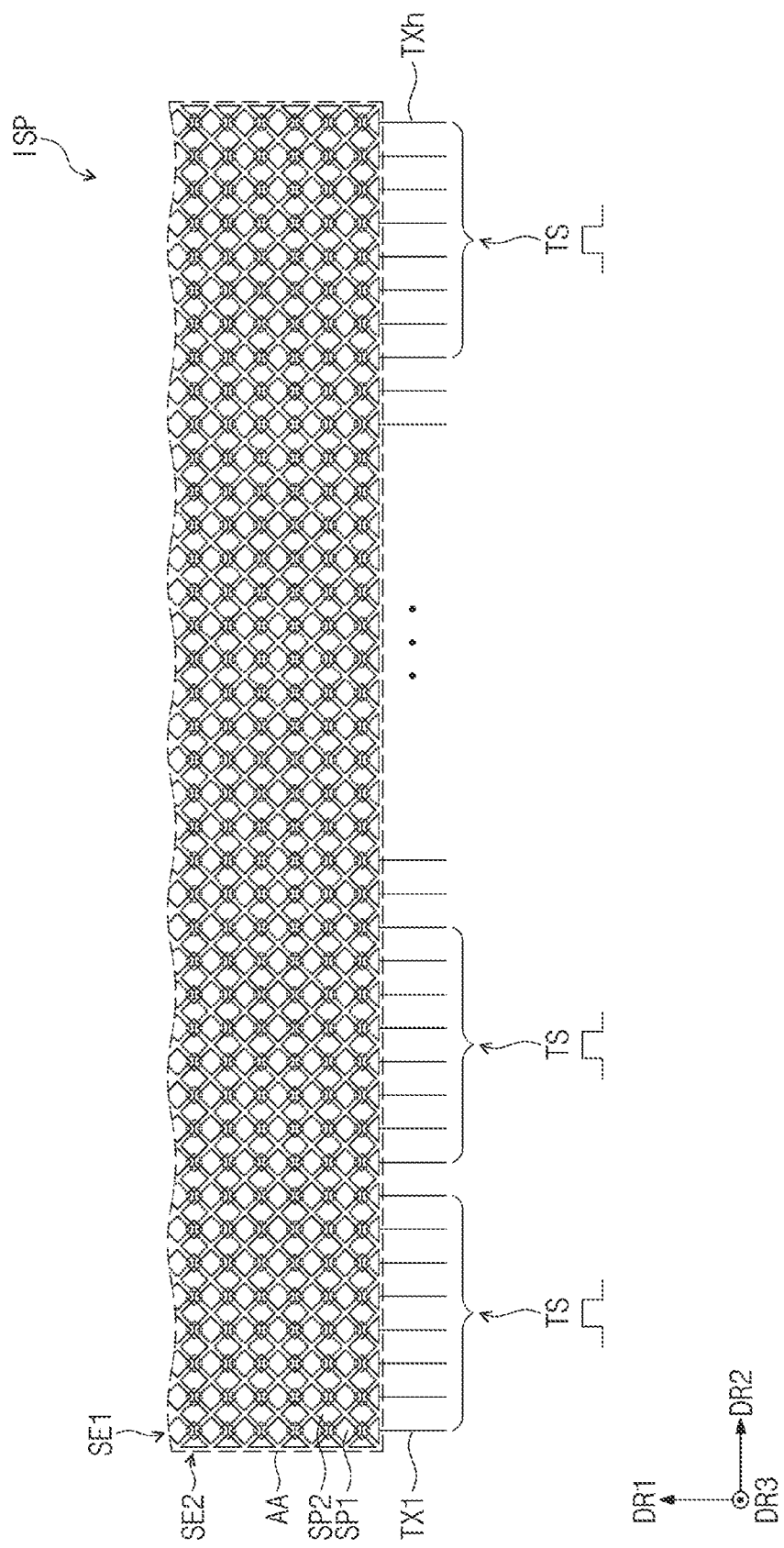
FIG. 12 is a diagram for describing an operation of a first proximity sensing mode of an input sensing part illustrated in FIG. 7 according to an embodiment of the present disclosure.

FIG. 12 is a diagram for describing an operation of a first proximity sensing mode of an input sensing part illustrated in FIG. 7.

In an embodiment, a lower portion of the input sensing part ISP and the driving signal TS applied to the first lines TX1 to TXh are illustrated in FIG. 12. The sensing control part T-IC illustrated in FIGS. 10 and 11 is omitted in FIG. 12.

Referring to FIGS. 7 and 12, the input sensing part ISP may be driven in the first proximity sensing mode. In an embodiment, in the first proximity sensing mode, the driving signal TS is simultaneously applied to "M" lines. Herein, "M" may be a natural number of 2 or more. The driving signal TS may be sequentially applied every "M" lines.

When "M" is 8, the driving signal TS may be simultaneously applied to eight first lines belonging to a first group, and the driving signal TS may then be simultaneously applied to eight first lines belonging to a second group following the first group. The above driving may be identically performed with respect to first lines belonging to the remaining groups such that the driving signal TS is simultaneously applied to the first lines belonging to the last group. In an embodiment, the driving signal TS is simultaneously applied to eight lines, but the number of lines to which the driving signal TS is simultaneously applied is not limited thereto.

Since the driving signal TS is simultaneously applied to "M" lines and is sequentially applied every "M" lines, the driving signal TS may be applied to the first sensing electrodes SE1. Accordingly, a capacitance may be formed between the first and second sensing electrodes SE1 and SE2. When the user comes close to the input sensing part ISP, the proximity state of the user may be sensed. In this case, as in the mutual sensing mode described with reference to FIG. 10, the sensing signal SS may be output through the second sensing electrodes SE2, and thus, the proximity state of the user may be sensed.

The operation in the first proximity sensing mode may be substantially identical to the operation in the mutual sensing mode of FIG. 10 except that the driving signal TS is simultaneously applied to "M" lines.

The electric field may be proportional to the number of transmission lines to which the driving signal TS is simultaneously applied. As the number of transmission lines to which the driving signal TS is simultaneously applied increases, the electric field may be formed more greatly.

The first proximity sensing mode may refer to a driving mode for sensing the proximity state of the user, and the user may be distant from the input sensing part ISP by as much as a given distance without the direct touch on the input sensing part ISP. Accordingly, the proximity state of the user may be sensed only when the electric field greater than that in the direct touch is formed on the input sensing unit ISP. In an embodiment of the present disclosure, since the driving signal TS is simultaneously applied to "M" lines, the electric field greater than that in the direct touch may be formed on the input sensing part ISP, and thus, the first proximity sensing mode may be performed.

Figure 13:
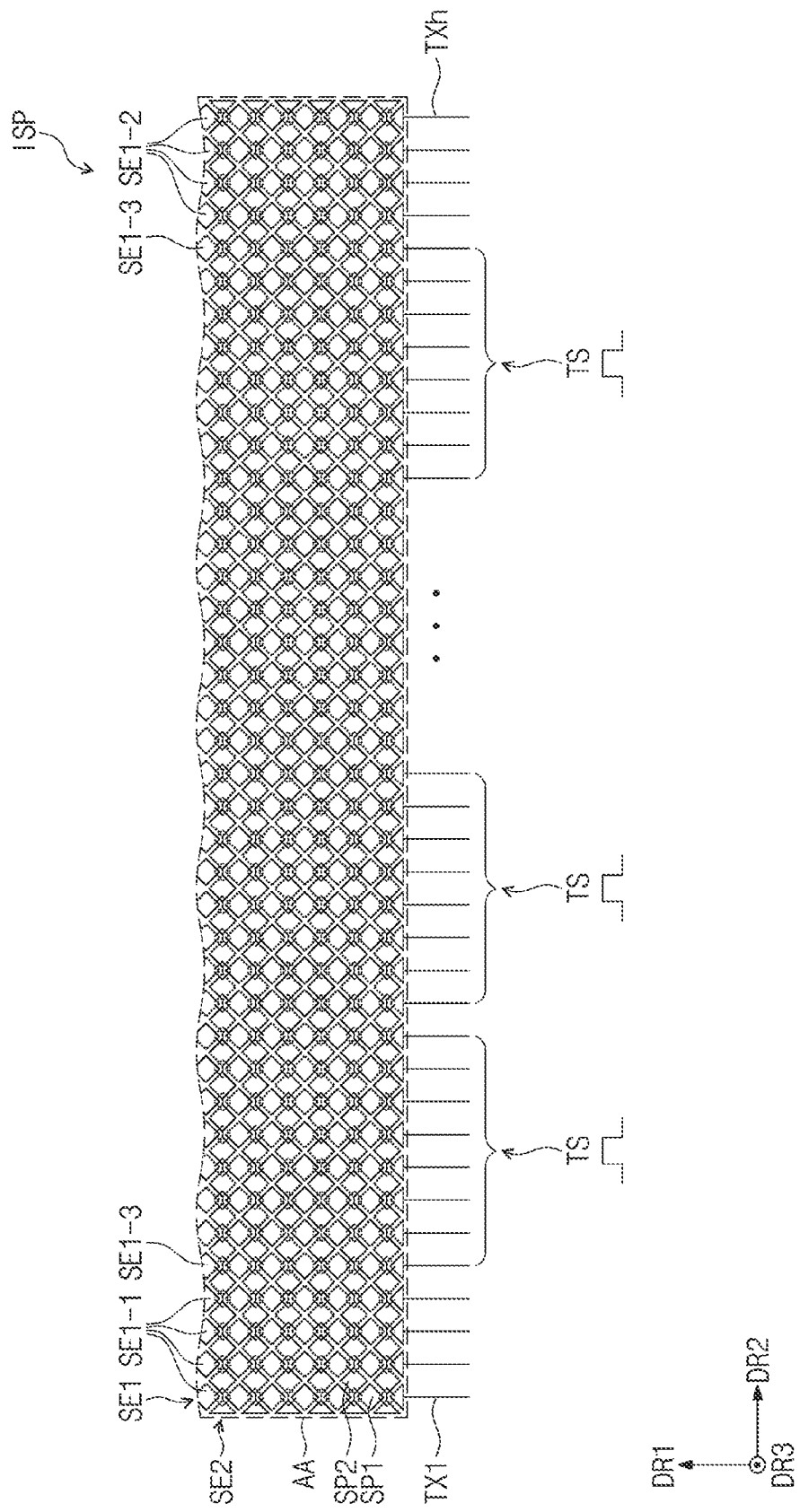
FIG. 13 is a diagram for describing an operation of a second proximity sensing mode of an input sensing part illustrated in FIG. 7 according to an embodiment of the present disclosure.

FIG. 13 is a diagram for describing an operation of a second proximity sensing mode of an input sensing part illustrated in FIG. 7.

In an embodiment, FIG. 13 shows a plan view corresponding to FIG. 12.

Referring to FIGS. 7 and 13, the input sensing part ISP may be driven in the second proximity sensing mode. In the second proximity sensing mode, the driving signal TS is not applied to some of the first sensing electrodes SE1, and the driving signal TS is applied to the others thereof.

In detail, the first sensing electrodes SE1 may include (1-1)-th sensing electrodes SE1-1, (1-2)-th sensing electrodes SE1-2, and (1-3)-th sensing electrodes SE1-3. The (1-1)-th sensing electrodes SE1-1 and the (1-2)-th sensing electrodes SE1-2 may be spaced from each other in the second direction DR2. The (1-3)-th sensing electrodes SE1-3 may be disposed between the (1-1)-th sensing electrodes SE1-1 and the (1-2)-th sensing electrodes SE1-2.

In an embodiment, the (1-1)-th sensing electrodes SE1-1 and the (1-2)-th sensing electrodes SE1-2 are adjacent to opposite sides of the input sensing part ISP, which are opposite to each other in the second direction DR2. That is, the (1-1)-th sensing electrodes SE1-1 and the (1-2)-th sensing electrodes SE1-2 may be adjacent to the border or outer boundary of the input sensing part ISP.

In the first proximity sensing mode illustrated in FIG. 12, the driving signal TS is applied to the (1-1)-th sensing electrodes SE1-1, the (1-2)-th sensing electrodes SE1-2, and the (1-3)-th sensing electrodes SE1-3.

However, in the second proximity sensing mode illustrated in FIG. 13, the driving signal TS is not applied to the (1-1)-th sensing electrodes SE1-1 and the (1-2)-th sensing electrodes SE1-2. In the second proximity sensing mode, the driving signal TS is applied only to the (1-3)-th sensing electrodes SE1-3. That is, the driving signal TS is not applied to the (1-1)-th sensing electrodes SE1-1 and the (1-2)-th sensing electrodes SE1-2 adjacent to the border of the input sensing part ISP, and the driving signal TS is applied to the remaining sensing electrodes, that is, the (1-3)-th sensing electrodes SE1-3.

As in the first proximity sensing mode, even in the second proximity sensing mode, the driving signal TS is simultaneously applied to "M" lines and may be sequentially applied every "M" lines, and thus, the driving signal TS may be applied to the first sensing electrodes SE1. Accordingly, the electric field greater than that in the direct touch may be formed on the input sensing part ISP, and the proximity state of the user may be sensed. Also, the sensing signal SS may be output through the second sensing electrodes SE2.

Referring to FIGS. 12 and 13, in an embodiment, the number of first sensing electrodes SE1 to which the driving signal TS is simultaneously applied in the second proximity sensing mode is equal to the number of first sensing electrodes SE1 to which the driving signal TS is simultaneously applied in the first proximity sensing mode.

Figure 14:
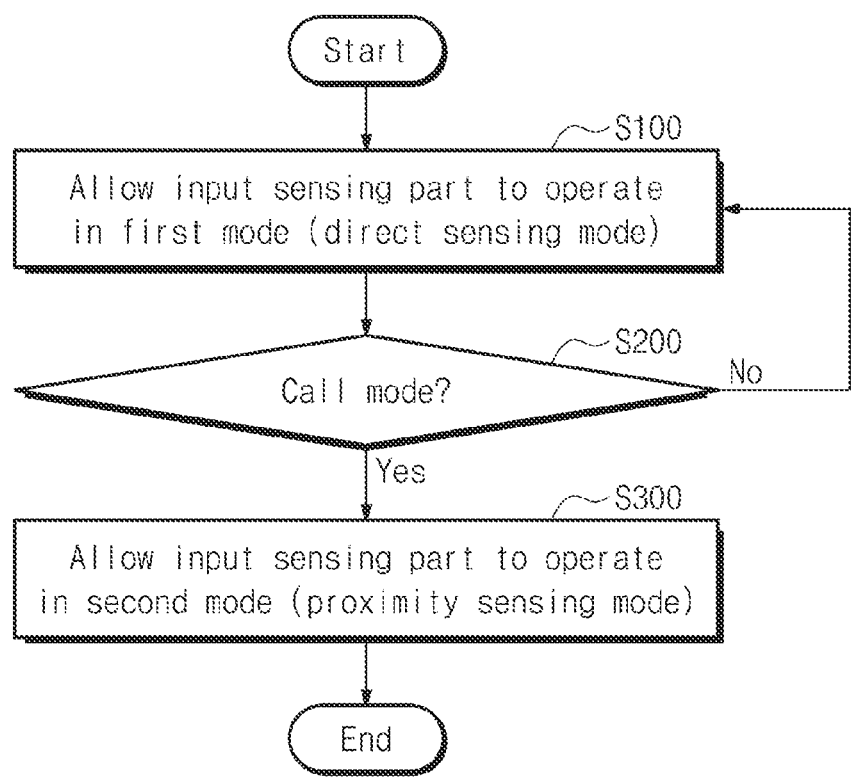
FIG. 14 is a flowchart for describing a driving method of an input sensing part according to an embodiment of the present disclosure according to an embodiment of the present disclosure.

FIG. 14 is a flowchart for describing a driving method of an input sensing part according to an embodiment of the present disclosure.

Referring to FIGS. 10, 11, and 14, in operation S100, the input sensing part ISP is driven in a first mode. The first mode may be a direct sensing mode. In the first mode, the input sensing part ISP may be driven in the direct sensing mode. The direct sensing mode may be a mode for sensing the user's direct touch on the input sensing part ISP. For example, when the user plays a game through the display device DD, the user may directly touch the display device DD to play the game.

The direct sensing mode may be the mutual sensing mode or the self-sensing mode described with reference to FIGS. 10 and 11. The direct sensing mode may be performed in the first mode repeatedly plural times.

In operation S200, whether a current mode is a call mode is determined. The call mode may a driving mode of receiving a call or making a call. In the call mode, the user may make a call. In the call mode, that is, when the user makes a call, the procedure may proceed to operation S300. When the current mode is not the call mode, that is, when the user does not make a call, the procedure proceeds to operation S100.

In the call mode, in operation S300, the input sensing part ISP is driven in a second mode. The second mode may be the proximity sensing mode. In the second mode, the input sensing part ISP may be driven in the proximity sensing mode. The proximity sensing mode may be performed in the second mode repeatedly plural times.

In the proximity sensing mode, a state where the user comes close to the input sensing part ISP, that is, the proximity state of the user may be sensed. For example, when the display device DD is a mobile phone and the user receives a call, the user may bring the mobile phone to be close to the ear and may make a call. When the user brings the mobile phone to be close to the ear, the proximity state of the user may be sensed by the input sensing part ISP.

When the state where the user comes close to the mobile phone is sensed, a given event or action corresponding to the proximity sensing may be performed. For example, when the user brings the mobile phone to be close to the ear, because the user is incapable of viewing the mobile phone, the display screen may be turned off, and thus, a power saving mode may be performed. That is, as described above, the main processor MF may turn off the display panel DP.

A mode of operation may be the mutual sensing mode or the self-sensing mode that are performed before and after the proximity sensing mode. Also, the proximity sensing mode may be the first proximity sensing mode or the second proximity sensing mode. The above mode will be described in detail with reference to FIG. 18.

When the call mode ends, the first mode may be again performed. For example, after operating in the proximity sensing mode for a first period of time, if the user ends the call at the end of the first period, the method can resume to operation S100 during a second period of time after the first period of time to operate in the direct sensing mode.

Figure 15:
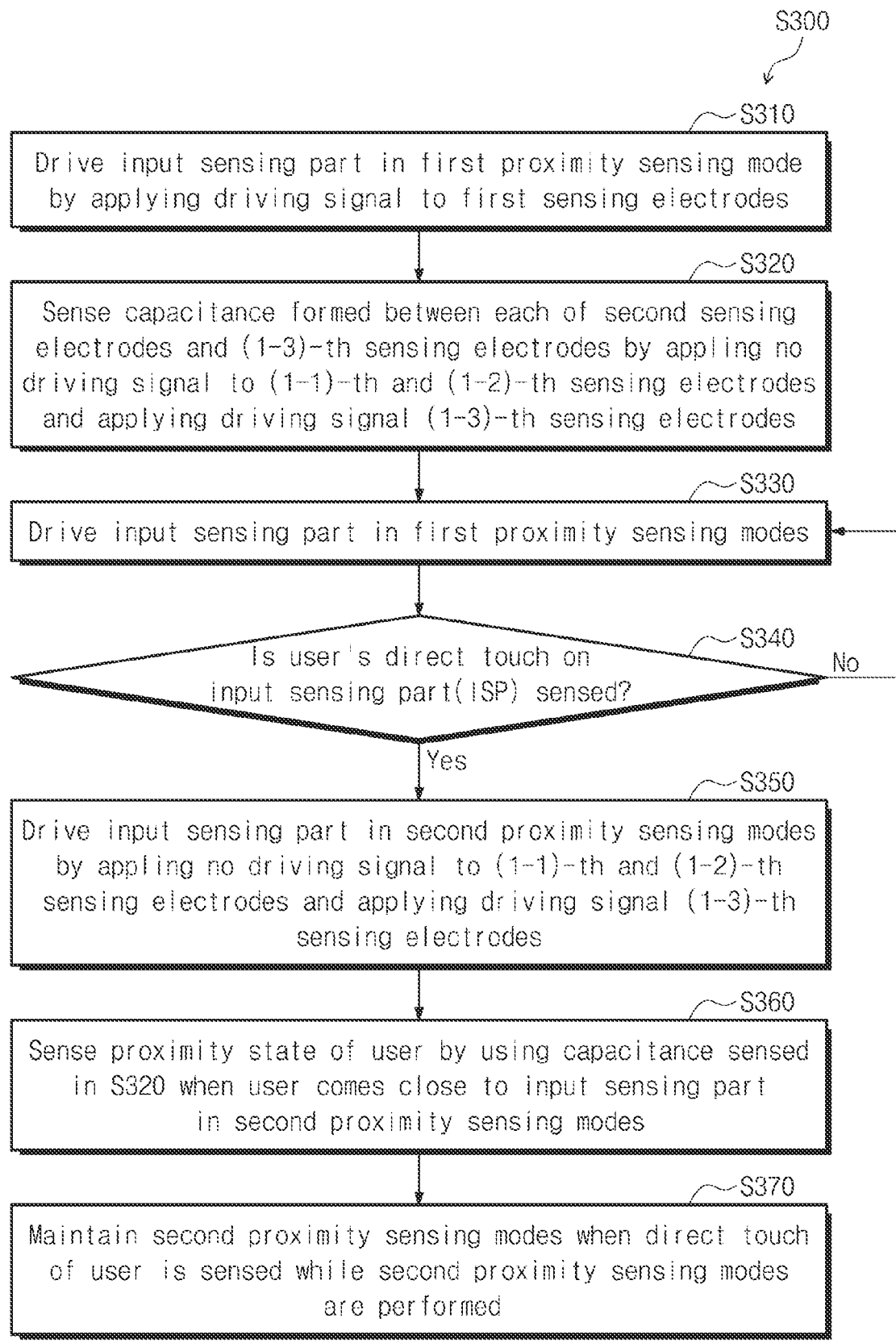
FIG. 15 is a flowchart illustrating driving an input sensing part in a second mode illustrated in FIG. 14 in detail according to an embodiment of the present disclosure.
Figure 16:
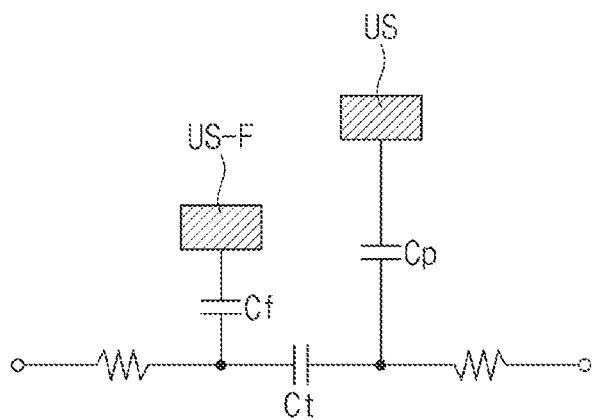
FIG. 16 is a diagram illustrating capacitances when a direct touch is performed in a proximity sensing mode according to an embodiment of the present disclosure.
Figure 17:
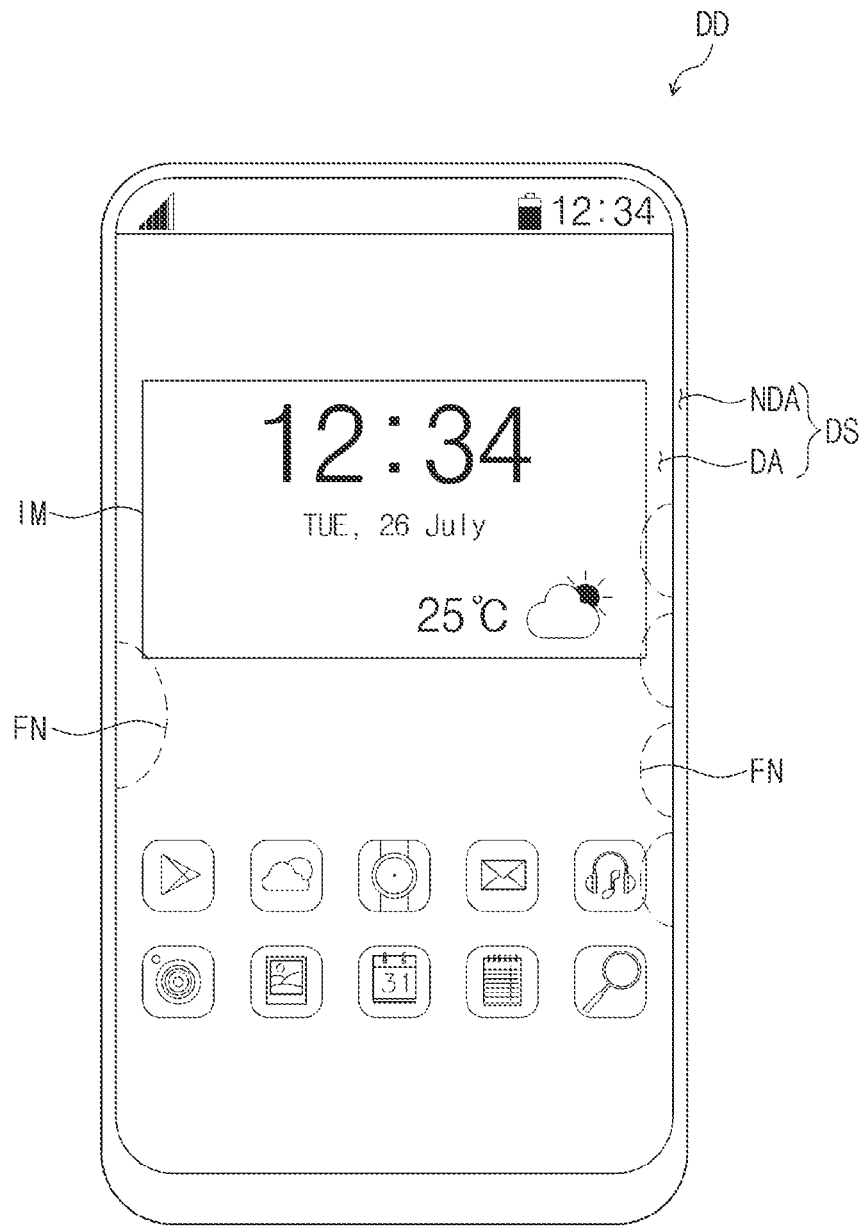
FIG. 17 is a diagram illustrating an example where a direct touch of a user is performed in a proximity sensing mode according to an embodiment of the present disclosure.

FIG. 15 is a flowchart illustrating driving an input sensing part in a second mode illustrated in FIG. 14 in detail. FIG. 16 is a diagram illustrating capacitances when a direct touch is performed in a proximity sensing mode. FIG. 17 is a diagram illustrating an example where a direct touch of a user is performed in a proximity sensing mode.

When the input sensing part ISP is driven in the proximity sensing mode of the second mode, in operation S300, the input sensing part ISP may be driven through the following procedure.

Referring to FIGS. 12 and 15, in operation S310, as the driving signal TS is applied to the first sensing electrodes SE1, the input sensing part ISP may be driven in the first proximity sensing mode. In the first proximity sensing mode, the input sensing part ISP may be driven as described with reference to FIG. 12.

Referring to FIGS. 16 and 17, the direct touch may be performed in the proximity sensing mode. For example, when the driving signal TS is applied to the first sensing electrodes SE1, a first capacitance Ct may be formed between each of the second sensing electrodes SE2 and the first sensing electrodes SE1 supplied with the driving signal TS.

When the user US comes close to the input sensing part ISP, a second capacitance Cp may be formed between the user US and the input sensing part ISP. The first capacitance Ct may change due to the second capacitance Cp, and the variation of the first capacitance Ct may be sensed; in this case, the proximity state of the user US may be sensed.

In the proximity sensing mode, the user US may directly touch the input sensing part ISP. For example, as illustrated in FIG. 17, the user US may make a call in a state of grasping the mobile phone (e.g., the display device) DD. As fingers FN of the user US contact a portion of the mobile phone, which is closer to the center of the mobile phone with respect to the border of the mobile phone, the fingers FN may touch the display area DA adjacent to the border of the mobile phone. In this case, the direct touch of the user US may be performed in the proximity sensing mode.

When the user US makes the direct touch, a third capacitance Cf may be formed between the user US and the input sensing part ISP. The first capacitance Ct and the second capacitance Cp may change due to the third capacitance Cf. In this case, the proximity state of the user US may not be normally sensed due to the third capacitance Cf. In an embodiment of the present disclosure, when the proximity sensing mode is performed, even though the direct touch of the user US is performed, operation S320 to operation S360 may be performed such that the proximity state of the user US is normally sensed.

Referring to FIGS. 13 and 15, in operation S320, the driving signal TS is not applied to the (1-1)-th sensing electrodes SE1-1 and the (1-2)-th sensing electrodes SE1-2, and the driving signal TS is applied to the (1-3)-th sensing electrodes SE1-3. A capacitance formed between each of the second sensing electrodes SE2 and the (1-3)-th sensing electrodes SE1-3 may be sensed.

The sensed capacitance may be used in the second proximity sensing mode to be performed afterwards, which will be described in detail below. Operation S320 may be substantially identical to the operation of applying the driving signal TS to the (1-3)-th sensing electrodes SE1-3 in FIG. 13. Accordingly, operation S320 may be substantially defined as an operation in which the capacitance is sensed in the second proximity sensing mode.

In operation S330, the input sensing part ISP is driven in the first proximity sensing modes. In operation S340, the user's direct touch on the input sensing part ISP may be detected. When the direct touch of the user US is not sensed, operation S330 is performed. When the direct touch of the user US is sensed, operation S350 is performed.

The mutual sensing mode and the self-sensing mode may be performed before and after each of the first proximity sensing modes. In operation S340, the direct touch of the user US may be performed in the mutual sensing mode or the self-sensing mode. The timing when the mutual sensing mode and the self-sensing mode are performed before and after each of the first proximity sensing modes will be described with reference to FIG. 18.

In FIG. 17, the fingers FN of the user US may touch the display area DA adjacent to the border of the mobile phone in a state where the user US grasps the mobile phone. The area that is touched by the fingers FN of the user US may substantially correspond to the area where the (1-1)-th sensing electrodes SE1-1 and the (1-2)-th sensing electrodes SE1-2 are disposed. Accordingly, the direct touch of the user US may be sensed by the (1-1)-th sensing electrodes SE1-1 and the (1-2)-th sensing electrodes SE1-2 during the proximity sensing mode.

In operation S350, the driving signal TS is not applied to the (1-1)-th and (1-2)-th sensing electrodes SE1-1 and SE1-2, and the driving signal TS is applied to the (1-3)-th sensing electrodes SE1-3; in this case, the input sensing part ISP may be driven in the second proximity sensing modes.

In operation S360, when the user US comes close to the input sensing part ISP in the second proximity sensing modes, the proximity state of the user US may be sensed by using the capacitance sensed in operation S320.

In the first proximity sensing modes, the input sensing part ISP may be driven by applying the driving signal TS to all the first sensing electrodes SE1. In an embodiment, when the variation of the capacitance formed by each of the second sensing electrodes SE2 and the first sensing electrodes SE1 supplied with the driving signal TS is at least 20% or more, the sensing control part T-IC may sense the proximity state of the user US.

For example, when the first capacitance Ct formed by each of the second sensing electrodes SE2 and the first sensing electrodes SE1 supplied with the driving signal TS is 100 pF, the first capacitance Ct may change from 100 pF to 80 pF due to the second capacitance Cp. Because the variation is 20%, in this case, the sensing control part T-IC may recognize the proximity state of the user US and may output a sensing value.

However, in the second proximity sensing modes, the driving signal TS is not applied to all the first sensing electrodes SE1. As described above, the driving signal TS is not applied to the (1-1)-th sensing electrodes SE1-1 and the (1-2)-th sensing electrodes SE1-2, and the driving signal TS is applied to the (1-3)-th sensing electrodes SE1-3.

Accordingly, the first capacitance Ct may change in the second proximity sensing modes. In operation S320, the sensing control part T-IC may sense the first capacitance Ct of the second proximity sensing mode. In an embodiment, in operation S320, the first capacitance Ct formed between each of the second sensing electrodes SE2 and the (1-3)-th sensing electrodes SE1-3 supplied with the driving signal TS may be 90 pF.

As described above, when the variation of the first capacitance Ct is at least 20%, the proximity state of the user US may be sensed. In the second proximity sensing modes, the first capacitance Ct may change from 90 pF to 72 pF due to the second capacitance Cp. Because the variation is 20%, the sensing control part T-IC may recognize the proximity state of the user US and may output a sensing value.

The mutual sensing mode and the self-sensing mode may be performed before and after each of the second proximity sensing modes. When the direct touch of the user US is sensed in the mutual sensing mode or the self-sensing mode while the second proximity sensing modes are performed, in operation S370, the second proximity sensing modes may be maintained.

FIGS. 13, 15, and 17, in the second proximity sensing modes, the driving signal TS is not applied to the (1-1)-th and (1-2)-th sensing electrodes SE1-1 and SE1-2. That is, when the direct touch of the user US is sensed, the second proximity sensing modes is performed; in this case, the (1-1)-th and (1-2)-th sensing electrodes SE1-1 and SE1-2 are not driven.

When the user US grasps the mobile phone DD illustrated in FIG. 17, the fingers FN of the user US may grasp the border of the mobile phone DD. The (1-1)-th and (1-2)-th sensing electrodes SE1-1 and SE1-2 may be adjacent to the border of the mobile phone DD. Even though the user US directly touches the input sensing part ISP adjacent to the border of the mobile phone DD during the second proximity sensing modes, the direct touch may not be sensed. Because the third capacitance Cf described above is not formed at the (1-1)-th and (1-2)-th sensing electrodes SE1-1 and SE1-2, the proximity state of the user US may be normally sensed.

Figure 18:
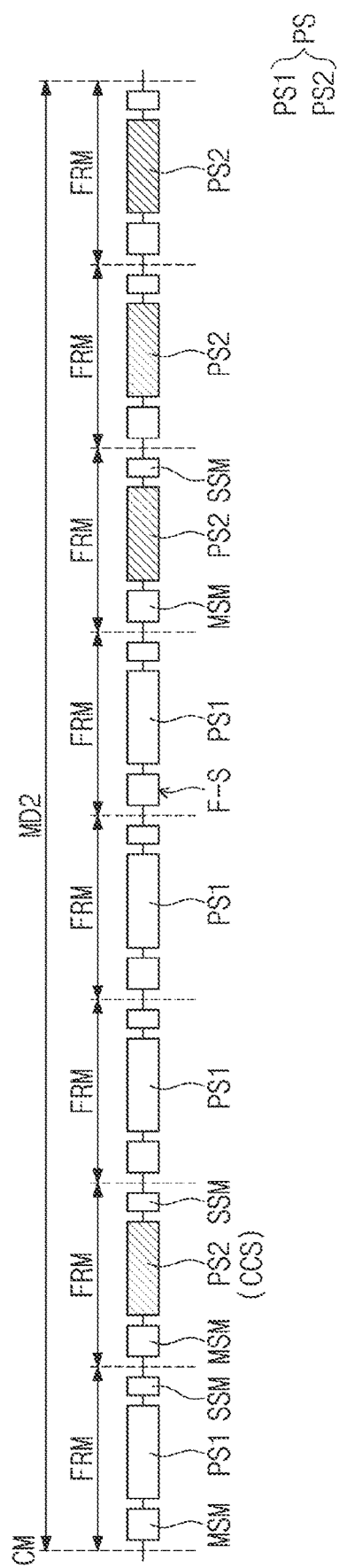
FIGS. 18 and 19 are diagrams illustrating driving timings in a second mode illustrated in FIG. 15 according to an embodiment of the present disclosure.
Figure 19:
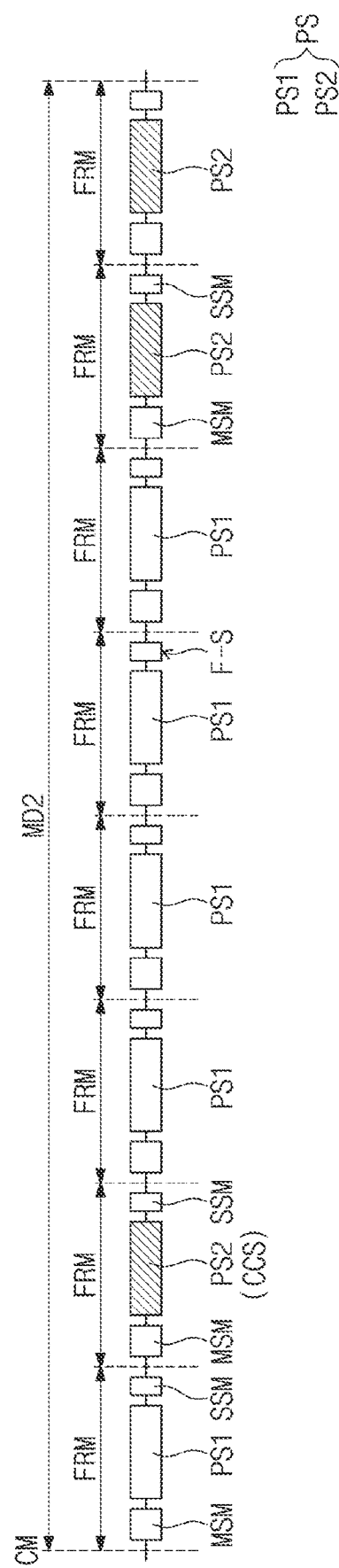

FIGS. 18 and 19 are diagrams illustrating driving timings in a second mode illustrated in FIG. 15.

Referring to FIGS. 12, 13, 15, 18, and 19, in a call mode CM, the input sensing part ISP enters a second mode MD2, and proximity sensing modes PS may be performed. The proximity sensing modes PS may be performed every frame FRM (e.g., each frame period). The proximity sensing modes PS may include a first proximity sensing modes PS1 and a second proximity sensing modes PS2.

A mutual sensing mode MSM may be performed before each of the first and second proximity sensing modes PS1 and PS2, and a self-sensing mode SSM may be performed after each of the first and second proximity sensing modes PS1 and PS2. The mutual sensing mode MSM and the self-sensing mode SSM may be performed in each of the frames FRM.

In each of the frames FRM, the input sensing part ISP may be driven in the mutual sensing mode MSM and may be driven in the self-sensing mode SSM. In each of the frames FRM, the direct touch of the user may be sensed in the mutual sensing mode MSM and the self-sensing mode SSM.

Since the first proximity sensing mode PS1 is performed in the first frame of the second mode MD2 and the second proximity sensing mode PS2 is performed in the second frame, a capacitance sensing operation CCS may be performed. The capacitance sensing operation CCS may be performed in operation S320 described above. In an embodiment, the capacitance sensing operation CCS may be performed at a time point close to a start time point of the call mode CM.

In an embodiment, the capacitance sensing operation CCS may be performed in the second frame, but the present disclosure is not limited thereto. For example, the capacitance sensing operation CCS may be performed in the first frame. Also, the capacitance sensing operation CCS may be performed at an arbitrary time point before the second proximity sensing modes PS2 are performed.

An embodiment where the capacitance sensing operation CCS is performed once is illustrated, but the present disclosure is not limited thereto. For example, the capacitance sensing operation CCS may be performed plural times to make the capacitance sensing accuracy high. For example, the capacitance may change depending on an ambient environment such as a temperature. Accordingly, when the capacitance sensing operation CCS is performed plural times, the capacitance sensing accuracy may be improved.

Referring to FIGS. 18 and 19, a direct touch F-S of the user may be performed in the mutual sensing mode MSM or the self-sensing mode SSM of any one of frames where the first proximity sensing modes PS1 are performed. The second proximity sensing modes PS2 may be performed in a frame after a frame where the direct touch F-S of the user is performed.

Referring to FIG. 18, the direct touch F-S of the user may be performed in the mutual sensing mode MSM. The operation of processing the direct touch F-S of the user may be performed in the frame where the direct touch F-S of the user is performed. When the direct touch F-S of the user is performed in the mutual sensing mode MSM, the second proximity sensing modes PS2 may be performed from a frame following the frame where the direct touch F-S of the user is performed. The second proximity sensing modes PS2 may be performed as much as the given number of times.

Referring to FIG. 19, the direct touch F-S of the user may be performed in the self-sensing mode SSM. Because the self-sensing mode SSM is performed at a rear portion of the frame FRM, the operation of processing the direct touch F-S of the user is not performed in the frame where the direct touch F-S of the user is performed.

The operation of processing the direct touch F-S of the user may be performed in a frame that is received after the frame where the direct touch F-S of the user is performed. Accordingly, when the direct touch F-S of the user is performed in the self-sensing mode SSM, the second proximity sensing modes PS2 may be performed from a frame that is followed after a frame following the frame where the direct touch F-S of the user is performed is skipped.

While the second proximity sensing modes PS2 are performed, the direct touch F-S of the user may be sensed in the mutual sensing mode MSM or the self-sensing mode SSM. In this case, the second proximity sensing modes PS2 may be maintained. However, when the direct touch F-S of the user is not performed while the second proximity sensing modes PS2 are performed, the second proximity sensing modes PS2 may be terminated.

FIG. 20 is a diagram for describing an operation of a second proximity sensing mode according to an embodiment of the present disclosure.

In an embodiment, FIG. 20 shows a plan view corresponding to FIG. 13.

Referring to FIGS. 12 and 20, the number of first sensing electrodes SE1 to which the driving signal TS is simultaneously applied in the second proximity sensing mode may be different from the number of first sensing electrodes SE1 to which the driving signal TS is simultaneously applied in the first proximity sensing mode. For example, the number of first sensing electrodes SE1 to which the driving signal TS is simultaneously applied in the second proximity sensing mode may be less than the number of first sensing electrodes SE1 to which the driving signal TS is simultaneously applied in the first proximity sensing mode.

In FIG. 12, the number of first sensing electrodes SE1 to which the driving signal TS is simultaneously applied in the first proximity sensing mode may be "8". However, in FIG. 20, the number of first sensing electrodes SE1 to which the driving signal TS is simultaneously applied in the second proximity sensing mode may be "4". The number of first sensing electrodes SE1 described above is provided as an example, and the number of first sensing electrodes SE1 is not limited thereto.

According to an embodiment of the present disclosure, when a direct touch of a user is performed, a proximity sensing mode may be performed in a state where (1-1)-th and (1-2)-th sensing electrodes disposed at a location where the direct touch of the user can be performed are not driven and (1-3)-th sensing electrodes disposed between the (1-1)-th sensing electrodes and the (1-2)-th sensing electrodes are driven. Accordingly, even though the direct touch of the user is performed, the proximity sensing mode may be normally performed.

While the present disclosure has been described with reference to embodiments thereof, it will be apparent to those of ordinary skill in the art that various changes and modifications may be performed thereto without departing from the spirit and scope of the present disclosure as set forth in the following claims.

What is claimed is:

1. A method of driving an input sensor to detect a proximity of a user, the method comprising:
   driving the input sensor in a direct sensing mode to detect whether the user has performed a direct touch on the input sensor, the input sensor including a plurality of first sensing electrodes and a plurality of second sensing electrodes insulated from the first sensing electrodes; and
   upon determining the user is engaged in a call,
      driving the input sensor in a first proximity sensing mode to detect the proximity of the user by applying a driving signal to a first subset of the first sensing electrodes having two or more sensing electrodes, a second subset of the first sensing electrodes having two or more sensing electrodes that is spaced apart from the first subset and a third subset of the first sensing electrodes having two or more sensing electrodes disposed between the first subset and the second subset, when the user has not performed the direct touch; and
      driving the input sensor in a second proximity sensing mode to detect the proximity of the user by applying no driving signal to the sensing electrodes of the first and the second subsets and applying the driving signal to the sensing electrodes of the third subset, when the user has performed the direct touch,
      where the driving signal is applied simultaneously to M sensing electrodes of the third subset and M is a natural number of 2 or more, and
      in each of a plurality of frame periods,
      driving the input sensor in a mutual sensing mode; and
      driving the input sensor in a self-sensing mode,
         wherein, in the frame periods, the mutual sensing mode is performed before each of the first and second proximity sensing modes, and the self-sensing mode is performed after each of the first and second proximity sensing modes.

2. The method of claim 1, wherein the first sensing electrodes extend in a first direction and are arranged in a second direction intersecting the first direction, and wherein the first subset and the second subset are adjacent to opposite sides of the input sensor, which are opposite to each other in the second direction, respectively.

3. The method of claim 1, wherein the direct touch of the user is performed on the sensing electrodes of the first subset or the sensing electrodes of the second subset.

4. The method of claim 1, further comprising:
   sensing a capacitance formed between each of the second sensing electrodes and the sensing electrodes of the third subset by applying no driving signal to the sensing electrodes of the first and second subsets and applying the driving signal to the sensing electrodes of the third subset.

5. The method of claim 4, wherein the sensing of the capacitance is performed at a beginning of the call.

6. The method of claim 4, further comprising:
   sensing a proximity state of the user using the sensed capacitance.

7. The method of claim 1, wherein the direct touch of the user is performed in the mutual sensing mode.

8. The method of claim 1, wherein the direct touch of the user is performed in the self-sensing mode.

9. The method of claim 1, wherein, when the direct touch of the user is performed in the mutual sensing mode or the self-sensing mode of any one frame period among the frame periods, in which the first proximity sensing mode is performed, from among the frame periods, the second proximity sensing mode is performed in a frame period after the frame period where the direct touch of the user is performed.

10. The method of claim 9, wherein, when the direct touch of the user is performed in the mutual sensing mode, the second proximity sensing mode is performed from a frame period following the frame period where the direct touch of the user is performed.

11. The method of claim 9, wherein, when the direct touch of the user is performed in the self-sensing mode, the second proximity sensing mode is performed from a frame period which is followed after a frame period following the frame period where the direct touch of the user is performed.

12. The method of claim 1, wherein, when the direct touch of the user is sensed in the mutual sensing mode or the self-sensing mode while the second proximity sensing mode is performed, the second proximity sensing mode is maintained.

13. The method of claim 1, wherein a number of the first sensing electrodes to which the driving signal is simultaneously applied in the second proximity sensing mode is equal to a number of the first sensing electrodes to which the driving signal is simultaneously applied in the first proximity sensing mode.

14. The method of claim 1, wherein a number of the first sensing electrodes to which the driving signal is simultaneously applied in the second proximity sensing mode is different from the number of the first sensing electrodes to which the driving signal is simultaneously applied in the first proximity sensing mode.

15. A method of driving an input sensor to detect a proximity of a user, the method comprising:
   driving the input sensor in a direct sensing mode to detect whether the user has performed a direct touch on the input sensor, the input sensor including a plurality of first sensing electrodes and a plurality of second sensing electrodes insulated from the first sensing electrodes; and
   upon determining the user is engaged in a call,
      driving the input sensor in a first proximity sensing mode to detect the proximity of the user by applying a driving signal to each of the first sensing electrodes, when the user has not performed the direct touch; and
      driving the input sensor in a second proximity sensing mode to detect the proximity of the user by applying no driving signal to the first sensing electrodes in a first region adjacent to a first peripheral edge of the input sensor, applying no driving signal to the first sensing electrodes in a second region adjacent to a second peripheral edge of the input sensor opposing the first peripheral edge, and applying the driving signal simultaneously to at least two of the first sensing electrodes disposed between the first and second regions, when the user has performed the direct touch, and
      in each of a plurality of frame periods,
      driving the input sensor in a mutual sensing mode; and
      driving the input sensor in a self-sensing mode,
         wherein, in the frame periods, the mutual sensing mode is performed before each of the first and second proximity sensing modes, and the self-sensing mode is performed after each of the first and second proximity sensing modes.

16. An input sensor comprising:
a plurality of first sensing electrodes;
a plurality of second sensing electrodes insulated from the first sensing electrodes and extending to intersect the first sensing electrodes; and
a sensing control circuit configured to apply a driving signal to the first sensing electrodes,
wherein the first sensing electrodes comprises:
a first subset of the first sensing electrodes having two or more sensing electrodes;
a second subset of the first sensing electrodes having two or more sensing electrodes that is spaced apart from the first subset; and
a third subset of the first sensing electrodes having two or more electrodes that is disposed between the first subset and the second subset,
wherein, in a first proximity sensing mode, the driving signal is applied to the first subset, the second subset and the third subset, and
wherein, in a second proximity sensing mode, the driving signal is not applied to the first subset and the second subset, and the driving signal is applied to the third subset, where the driving signal is applied simultaneously to M sensing electrodes of the third subset and M is a natural number of 2 or more, and
wherein, in each of a plurality of frame periods, the input sensor is driven in a mutual sensing mode and in a self-sensing mode, and
wherein, in the frame periods, the mutual sensing mode is performed before each of the first and second proximity sensing modes, and the self-sensing mode is performed after each of the first and second proximity sensing modes.

17. An electronic device for providing an image comprising:
a display device comprising an input sensing part,
wherein the input sensing part comprises:
a plurality of first sensing electrodes;
a plurality of second sensing electrodes insulated from the first sensing electrodes and extending to intersect the first sensing electrodes; and
a sensing control circuit configured to apply a driving signal to the first sensing electrodes,
wherein the first sensing electrodes comprises:
a first subset of the first sensing electrodes having two or more sensing electrodes;
a second subset of the first sensing electrodes having two or more sensing electrodes that is spaced apart from the first subset; and
a third subset of the first sensing electrodes having two or more electrodes that is disposed between the first subset and the second subset,
wherein, in a first proximity sensing mode, the driving signal is applied to the first subset, the second subset and the third subset, and
wherein, in a second proximity sensing mode, the driving signal is not applied to the first subset and the second subset, and the driving signal is applied to the third subset, where the driving signal is applied simultaneously to M sensing electrodes of the third subset and M is a natural number of 2 or more, and
wherein, in each of a plurality of frame periods, the input sensor is driven in a mutual sensing mode and in a self-sensing mode, and
wherein, in the frame periods, the mutual sensing mode is performed before each of the first and second proximity sensing modes, and the self-sensing mode is performed after each of the first and second proximity sensing modes.

* * * * *